(12) United States Patent
Gaskill et al.

(10) Patent No.: US 7,334,517 B2
(45) Date of Patent: *Feb. 26, 2008

(54) SECTION DIVIDER ENSEMBLE FOR ROLLER GRILL FOR COOKING HUMAN FOOD

(75) Inventors: Timothy T. Gaskill, Edwardsville, IL (US); Michael Lee Huegerich, St. Louis, MO (US); Philip M. Ranft, Ballwin, MO (US)

(73) Assignee: Star Manufacturing International, Inc., St. Louis, MO (US)

( * ) Notice: Subject to any disclaimer, the term of this patent is extended or adjusted under 35 U.S.C. 154(b) by 455 days.

This patent is subject to a terminal disclaimer.

(21) Appl. No.: 10/831,722

(22) Filed: Apr. 23, 2004

(65) Prior Publication Data

US 2005/0051037 A1   Mar. 10, 2005

Related U.S. Application Data

(63) Continuation-in-part of application No. 10/284,609, filed on Oct. 31, 2002.

(51) Int. Cl.
*A47J 37/06* (2006.01)

(52) U.S. Cl. .......................... 99/339; 99/393; 99/423; 99/441; 99/443 R; 99/448

(58) Field of Classification Search ............ 99/339, 99/393, 402, 422, 423, 441, 426, 443 R, 99/443 C, 448, 449; 220/529, 533, 543, 220/544, 546
See application file for complete search history.

(56) References Cited

U.S. PATENT DOCUMENTS

| | | | |
|---|---|---|---|
| 2,185,979 A * | 1/1940 | Dumas ...................... 99/423 |
| 2,253,434 A | 8/1941 | Kernick ............................ 53/5 |
| 2,290,572 A | 7/1942 | Rakov ......................... 126/339 |
| 2,604,842 A * | 7/1952 | Dolce ........................... 99/423 |
| 2,697,395 A | 12/1954 | Steriss ......................... 99/423 |
| 2,905,076 A | 9/1959 | Del Francia ................. 99/443 |
| 3,298,303 A * | 1/1967 | Waller ......................... 99/423 |
| 3,472,156 A | 10/1969 | Bardeau et al. .............. 99/423 |
| 3,692,351 A | 9/1972 | Christopher et al. ...... 296/23 R |
| 3,756,219 A | 9/1973 | Snyder et al. ............. 126/191 |
| 3,981,233 A | 9/1976 | Nugarus ...................... 99/422 |
| 4,370,920 A | 2/1983 | Henriques et al. ............ 99/339 |
| 4,406,861 A | 9/1983 | Beauvais et al. ........... 422/113 |
| 4,516,485 A | 5/1985 | Miller ......................... 99/339 |
| 4,817,585 A | 4/1989 | Craver ....................... 126/200 |
| 5,458,051 A | 10/1995 | Alden et al. ................. 99/349 |
| 5,549,040 A | 8/1996 | Naramura .................... 99/349 |
| 5,722,315 A | 3/1998 | Naramura ...................... 9/349 |
| 5,782,171 A | 7/1998 | Crain et al. .................. 99/408 |

(Continued)

OTHER PUBLICATIONS

APW/Wyott—Hot Rod Rolling Grills; Aug. 1995.

(Continued)

*Primary Examiner*—Reginald L. Alexander
(74) *Attorney, Agent, or Firm*—Polster, Lieder, Woodruff & Lucchesi, L.C.

(57) ABSTRACT

A roller grill for cooking human food is disclosed which comprises a housing having a plurality of tubular cooking members rotatably mounted within the housing and a section divider ensemble for sectioning the tubular cooking members into a first cooking area and a second cooking area.

25 Claims, 13 Drawing Sheets

U.S. PATENT DOCUMENTS

| | | | |
|---|---|---|---|
| 6,166,353 A | 12/2000 | Senneville et al. | 219/385 |
| 6,393,971 B1 | 5/2002 | Hunot et al. | 99/341 |
| 2003/0197001 A1* | 10/2003 | Grohs | 219/450.1 |

OTHER PUBLICATIONS

Page from a trade magazine (publication date unknown, but product existed prior to Oct. 9, 1997), showing APW/Wyott Roller Grill.

Connolly Roll-A-Grill (publication date unknown, but products existed prior to Oct. 9, 1997).

Gold Medal Roller Grill Assemblies (publication date unknown, but products existed prior to Oct. 9, 1997).

Roundup Hot Dog Corrals (publication date unknown, products existed prior to Oct. 9, 1997).

Trade magazine advertisements showing Gold Medal Products Roller Grill, Berks Packing Company's Roller Grill, and other products (publication date unknown, products existed prior to Oct. 9, 1997)

Watlow Catalog pages (products such as shown existed prior to Oct. 9, 1997).

Fluoroplastics, published in *Modern Plastics Encyclopedia*, 1981-1982, discussing polytetrafluoroethylene (PTFE).

Website Information of Whitford, showing prior art information concerning PTFE (polytetrafluoroethlene), date unknown.

Attached Photographs Numbered 1 through 22, date unknown.

* cited by examiner

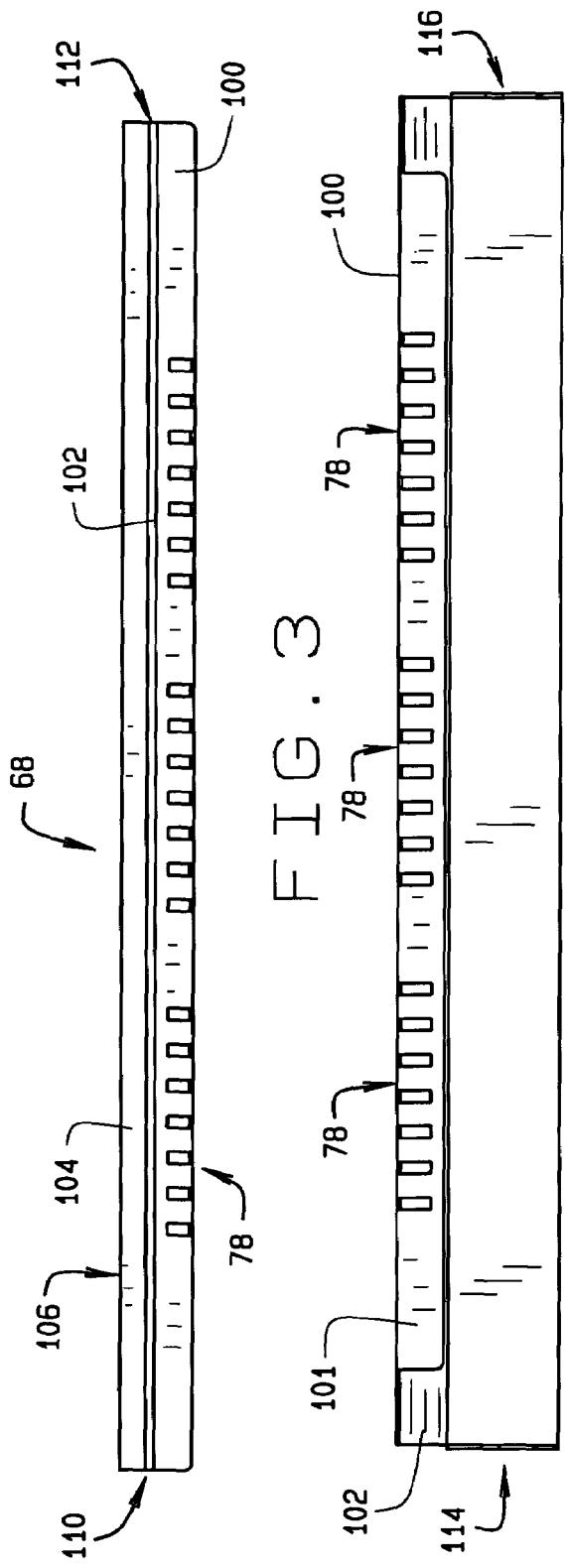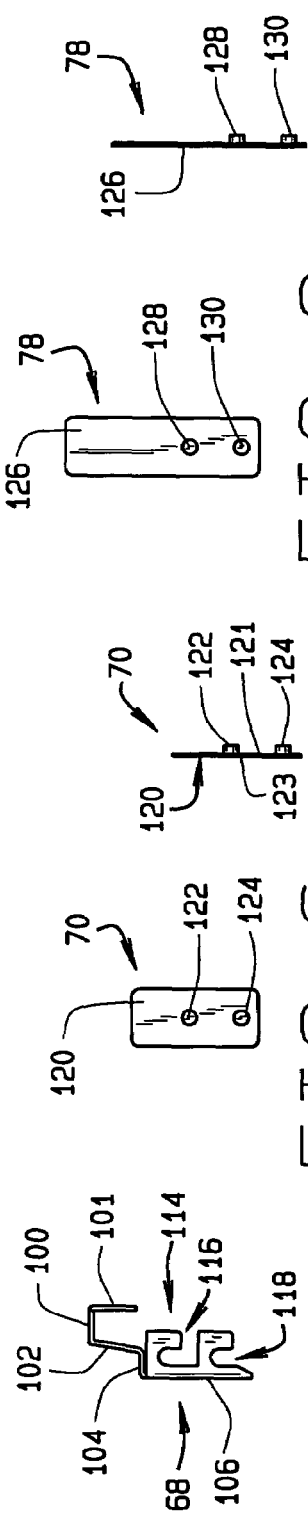

SECTION DIVIDER ENSEMBLE FOR ROLLER GRILL FOR COOKING HUMAN FOOD

CROSS REFERENCE TO RELATED APPLICATIONS

This application is a continuation-in-part of U.S. patent application Ser. No. 10/284,609, which was filed on Oct. 31, 2002.

STATEMENT REGARDING FEDERALLY SPONSORED RESEARCH OR DEVELOPMENT

Not applicable.

BACKGROUND OF THE INVENTION

This invention relates generally to a roller grill for cooking human food, and more particularly to a roller grill for cooking human food having a section divider ensemble.

Roller food grill assemblies are used in commercial establishments to quickly cook food products for customers. Such roller food grill assemblies typically have rotatable roller tubes for heating and cooking food. Roller tube cooking is especially adaptable to heating and cooking products that have an elongated shape, such as hot dogs, brats, and wieners. In this manner, the food product is placed on the heating surface of the roller tubes. As the roller tubes rotate, the food product is in constant contact with the roller tubes and the food product is evenly cooked and heated. However, due to the construction of these roller food grill assemblies it is difficult to cook food products having varying or differing lengths. Further, it may not be desirable to cook different food products on the same surface due to juices or tastes cooked from one product being absorbed onto another dissimilar product. For example, a hot dog may end up tasting like a brat. Additionally, it may be desirable to cook a relatively short food product, such as an egg roll, while at the same time it would be desirable to cook a relatively long food product, such as a foot long hotdog. In such situation the known food grill assemblies are not capable of being adjusted to compensate for food products having different lengths.

The present invention is designed to obviate and overcome many of the disadvantages and shortcomings experienced with roller food grill assemblies discussed hereinbefore and with other food grill assemblies used in the past, and to provide a roller food grill assembly which can be easily utilized to cook foods having differing or varying lengths. Moreover, the roller food grill assembly of the present invention is more advantageous than the roller food grill assemblies previously used in that it is capable of separately cooking foods that have different lengths. Further, the present roller food grill assembly segregates and prevents against the transfer of juices or tastes from one food product to another dissimilar food product. Also, the present section divider ensemble for a roller food grill may be a kit that can be employed to retrofit existing roller food grill assemblies.

SUMMARY OF THE INVENTION

In one form of the present invention, a roller grill for cooking human food comprises a housing having a plurality of tubular cooking members rotatably mounted within the housing, and a section divider ensemble for sectioning the tubular cooking members into a first cooking area and a second cooking area.

In another form of the present invention, a divider ensemble for a roller grill assembly for cooking a first food product having a first length or being of a first type, and a second food product having a second length, or being of a second type, the roller grill assembly comprising a housing and a plurality of rotatable tubular cooking members. The divider ensemble comprises a first mounting bracket having a plurality of openings positioned on a front of the housing, a second mounting bracket having a plurality of openings positioned at a back of the housing, and a divider member adapted to being inserted into the openings of the first and second mounting brackets to divide the tubular cooking members into a first cooking area for cooking the food product having the first length, or being of the first type, and a second cooking area for cooking the food product having the second length, or being of the second type.

In yet another form of the present invention, a divider ensemble for a roller grill assembly for cooking food, the roller grill assembly having a housing having a pair of sidewalls and a plurality of tubular cooking members, the divider ensemble comprises a first pair brackets mounted to the sidewalls at a front of the housing, the pair of brackets having a pair of projections, a second pair of brackets mounted to the sidewalls at a back of the housing, the pair of brackets having a pair of projections, a first mounting bracket having a series of openings and a pair of flanges each having a pair of notches that mate with the projections of the first pair of brackets, a second mounting bracket having a series of openings and a pair of flanges each having a pair of notches that mate with the projections of the second pair of brackets, and a divider member for positioning in the openings in the first and second mounting brackets for sectioning the tubular cooking members into a first cooking area and a second cooking area.

Features obtained by the invention as covered by one or more of the claims include one or more of the following: to provide an improved roller grill for cooking human food with the roller grill having a section divider ensemble; to provide a roller grill assembly for cooking human food having a section divider ensemble which is of simple construction and design and which can be easily employed with highly reliable results; to provide a roller grill assembly that is capable of cooking foods that have different lengths; to provide a roller grill assembly that is capable of preventing the transfer of juices or tastes from one food product to another food product when both of the products are being cooked at the same time; to provide a roller grill assembly in which foods having the same length may be cooked on one section of the roller grill assembly and foods having a different length may be cooked on another section of the roller grill assembly; to provide a roller grill assembly for cooking human food having a section divider ensemble which is removable; to provide a roller grill assembly for cooking human food having a number of divider ensembles for partitioning the roller grill assembly into various cooking areas; to provide a roller grill assembly for cooking human food with a section divide ensemble that is adjustable relative to the roller grill; to provide a divider ensemble for a roller grill assembly that can be easily installed; to provide a divider ensemble for a roller grill assembly that can be retrofitted to an existing roller grill assembly; to provide a divider ensemble for a roller grill assembly that has indicia that indicate what food product is being cooked in a particular section of the roller grill assembly; and to provide a divider ensemble for a roller grill assembly that can be easily removed from the roller grill assembly.

These and other objects and advantages of the present invention will become apparent after considering the following detailed specification in conjunction with the accompanying drawings.

BRIEF DESCRIPTION OF THE DRAWINGS

The objects of the invention are achieved as set forth in the illustrative embodiments shown in the drawings which form a part of the specification.

In the drawings:

FIG. 3 is a top view of a divider mounting bracket of the section divider ensemble;

FIG. 4 is a rear view of the divider mounting bracket of the section divider ensemble;

FIG. 5 is a side view of the divider mounting bracket of the section divider ensemble;

FIG. 6 is a front view of a short bracket of the section divider ensemble;

FIG. 7 is a side view of the short bracket shown in FIG. 6;

FIG. 8 is a front view of a long bracket of the section divider ensemble;

FIG. 9 is a side view of the long bracket shown in FIG. 8;

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the following description or shown in the accompanying drawings shall be interpreted as illustrative and not in a limiting sense.

General Review Of Housing

Figure 1:
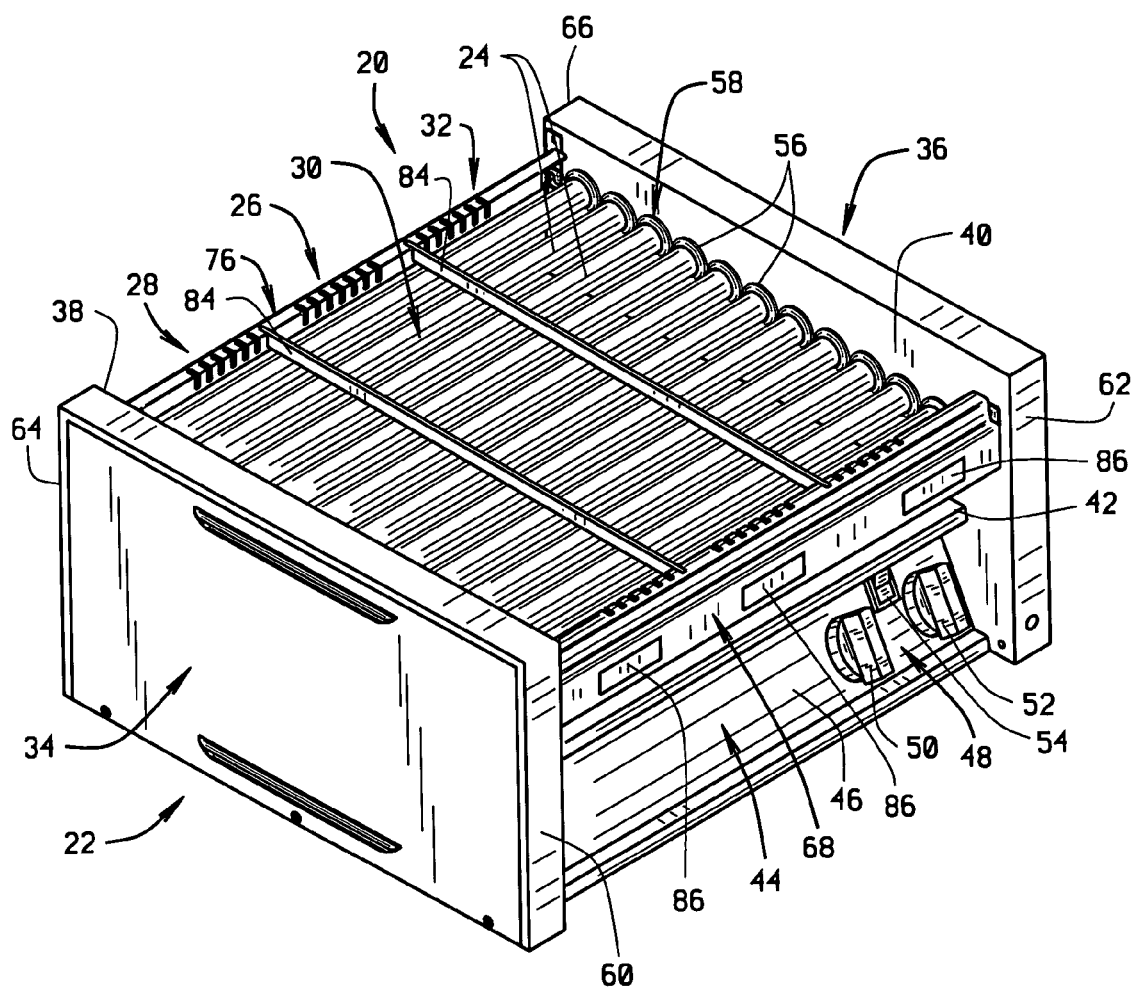
FIG. 1 is an orthogonal projection of a roller grill assembly having a section divider ensemble constructed according to the present invention.
Figure 2:
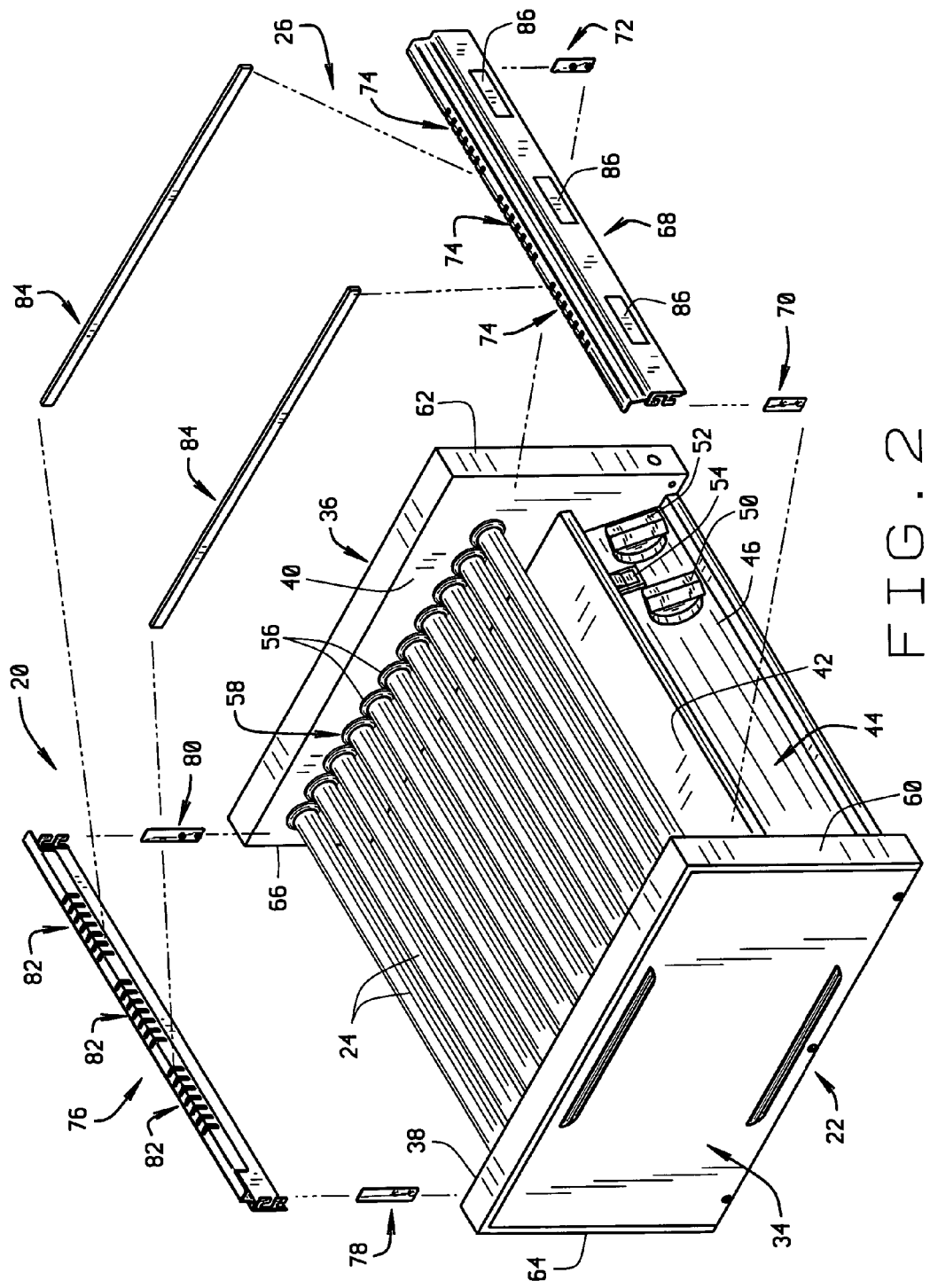
FIG. 2 is an exploded view of the section divider ensemble for the roller grill assembly of FIG. 1.

With reference now to FIGS. 1 and 2, a roller grill assembly for cooking human food having a section divider ensemble is generally designated by numeral 20. The assembly 20 generally comprises a main housing 22, upon which are mounted a plurality of rotatable tubular cooking members 24 which are adapted to being heated. The assembly 20 further comprises a section divider ensemble 26 for separating the cooking tubes 24 into cooking areas or sections such as sections 28, 30, and 32. The section divider ensemble 26 can be used with roller tube assemblies of various types wherein the tubes rotate relative to a housing to which they are mounted. The housing 22 can vary in size and configuration. A detailed example of such a roller grill assembly is shown in U.S. Pat. No. 6,393,971, which is assigned to the assignee of this application, and said patent is incorporated herein by this reference. The various manners or constructions in which the cooking tubes 24 are rotated, heated, or operated are also described in detail in such referenced patent.

The housing 22 comprises two generally rectangular side support frames 34 and 36. Each of the side support frames 34 and 36 are fabricated from a rigid material such as stainless steel and can be stamped so that they each have an interior sidewall 38 and 40, respectively. A separate grease drip tray 42 is provided beneath the roller tubes 24 to catch grease and fluids dripping there from. Towards its front, the housing 22 comprises a control panel 44 that has a middle wall section 46 that extends rearwardly at an angle of about 15° to 20°. A control assembly 48 is positioned on the control panel 44 and comprises a pair of temperature control knobs 50 and 52, which are rotatable for selectively controlling the temperature of the roller tubes 24. A power switch 54 is also mounted to the control panel 44 and is used to power the roller grill 20. Each of the frame sidewalls 34 and 36 has a plurality of holes 56 for mounting the rotatable cooking tubes 24 into tube sealing sub-assemblies 58. Each of the side support frames 34 and 36 has a front 60 and 62, respectively, and a back 64 and 66, respectively.

General Overview Of Section Divider Ensemble

As a general overview, the section divider ensemble 26 comprises a first or front divider mounting brace 68 that is configured to be positioned on a pair of side brackets 70 and 72. The front divider mounting brace 68 has a series of slots or openings 74 formed therein. The section divider ensemble 26 further comprises a second or back divider mounting brace 76 that is configured to be positioned on a pair of side brackets 78 and 80. The back divider mounting brace 76 has a series of slots or openings 82 formed therein that are aligned with the openings 74 of the front divider mounting brace 68. One or more divider bars or members 84 can be inserted into aligned slots 74 and 82 to form the cooking areas 28, 30, and 32. The divider members 84 are generally rectangular and sized and shaped to fit within the slots 74 and 82. The dividers 84 are long enough to span the distance between the front and back mounting braces 68 and 76. The positioning of the mounting braces 68 and 76 are such that the divider members 84 are positioned above the roller tubes 24. The front mounting brace 68 also includes a product identifier label 86 attached thereto to display or identify what product is being cooked within each of the cooking areas 28, 30, or 32. For example, the label 86 may have printed thereon the words "hot dog". The label 86 can be attached to the front mounting brace 68 using any suitable method, such as the label 86 being magnetized.

More Detailed Descriptions Of Divider Ensemble

Now a more detailed description is given of the divider ensemble 26. Referring now to FIGS. 3 and 4, the divider mounting brace 68 is illustrated. Although the mounting brace 68 is shown, it is to be understood that the divider mounting brace 76 is constructed in the same manner. The divider mounting brace 68 has a top wall 100 with a back wall 101 depending from the rear edge thereof. The series of slots or openings 78 are formed in the walls 100 and 101. The series of openings 78 are shown to have three series of seven openings. However, it is also contemplated that the brace 68 can have other series or number of openings. The top wall 100 is slanted forwarded and downwardly into a midsection 102. Midsection wall 102 ends into a ledge wall 104. The ledge wall 104 bends downwardly into a front wall 106. The divider mounting brace 68 also has a pair of ends 110 and 112. At the ends 110 and 112, a pair of mounting flanges 114 and 116, respectively extend from the outer edges of the front wall 106. The divider mounting brace 68 may be constructed or formed from metal such as stainless steel, and can be formed by stamping to be one unitary piece.

From the different perspective of FIG. 5, there is shown a side view of the divider mounting brace 68. The end 110 is depicted in FIG. 5. FIG. 5 shows the divider mounting brace 68 with the top wall 100 extending into the downwardly slanting midwall 102. The midwall 102 extends into the ledge wall 104. The front wall portion 106 depends from ledge wall 104. The top wall 100 is also shown to depend from the back wall 101. FIG. 5 also shows the mounting flange 114 having a pair of notches or keyholes 116 and 118 formed therein. The flange 114 and the notches 116 and 118 are used to secure or hold the divider mounting brace 68 to the housing 22, as will be explained more fully herein.

With reference now to FIGS. 6 and 7, the mounting bracket 70 is depicted. The bracket 70 has a rectangular shaped body 120. A pair of nubs or projections 122 and 124 extend from the inwardly facing bracket surface 123. The projections 122 and 124 are sized and shaped to be received in the notches 116 and 118 of the flanges 114 and 116 of divider mounting brace 68. The bracket has an outwardly facing surface 125. The bracket 72 is constructed in a similar manner.

FIGS. 8 and 9 illustrate the bracket 78. The bracket 78 has a rectangular shaped body 126 that is longer than the rectangular body 120 of the bracket 70. The body 126 has an inwardly facing surface 127 from which a pair of projections 128 and 130 project. The bracket has an outwardly facing surface 129. The projections 128 and 130 are received within the notches 116 and 118 in the flanges 114 and 116 of mounting brace 76. Once the notches 116 and 118 receive the projections 128 and 130, the divider mounting brace 76 is held in place. Also, the bracket 80 is constructed in a similar manner.

The outwardly facing bracket surfaces 123 and 129 can be secured to the frame side walls 38 and 40, respectively. The brackets 70, 72, 78 and 80 can both be constructed or formed from metal such as stainless steel. The brackets 70, 72, 78 and can be secured to the housing 22 such as by use of an adhesive, or by spot welding. For factory assembly, spot welding of the brackets to the side walls is preferred. For installation of the ensemble 26 in the field to an existing roller grill, use of adhesive to the bracket surfaces 123 and 129 is preferred to secure the brackets to the side walls 38 and 40.

The preferred embodiment has been described as the mounting braces having end flanges with notches to receive projections of support brackets. However, the support of the mounting braces and brackets can take on other configurations, such as the ends of the mounting braces having flanges with projections such as have been described for the brace, which projections are received within notches or grooves of support brackets associated with the housing.

From the foregoing, it can be seen that the assembly 20 comprises the section divider ensemble 26 comprising the front divider mounting brace 68, the back divider mounting brace 76, the side bracket a 72, 74, 78 and 80, and at least one divider member 84. The section divider ensemble 26 can be used with two divider numbers 84 to separate the cooking tubes 24 into the cooking areas 28, 30, and 32.

Further Description Of Housing

Figure 10:
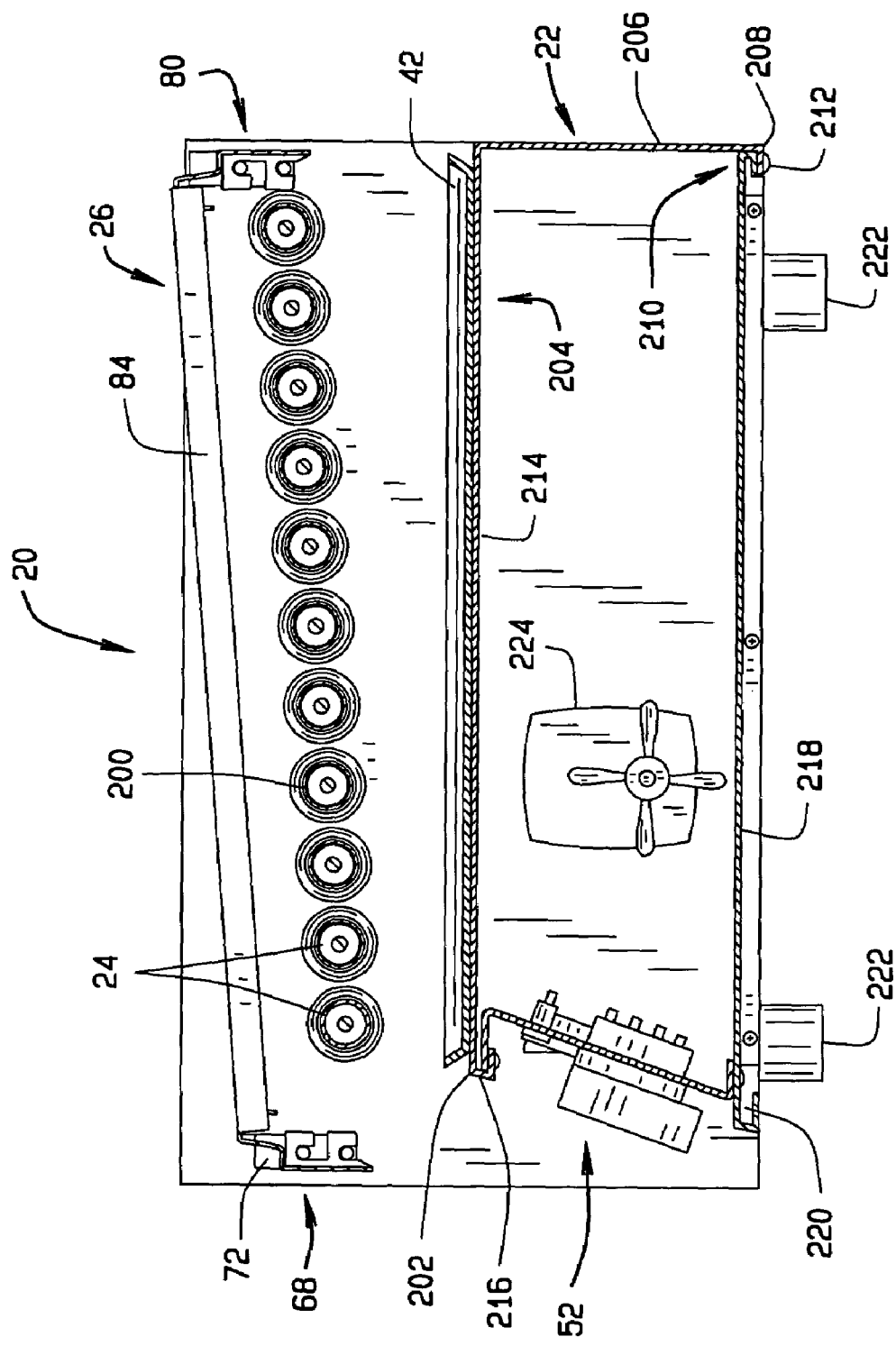
FIG. 10 is a partial cross-sectional view the roller grill assembly having a section divider ensemble taken along the plane of line 10-10 of FIG. 1.

FIG. 10 illustrates a partial cross-sectional view of the roller grill assembly 20 taken along the plane of line 10-10 of FIG. 1. The roller grill assembly 20 comprises the main housing 22, upon which are mounted the plurality of rotatable tubular cooking members 24 which are adapted to being heated by heating elements 200. Further, the heating elements 200 can take the form of the heating elements shown and disclosed in U.S. Pat. No. 6,393,971. Although not shown in detail, the heating elements 200 can comprise a pair of elements within each of the cooking members 24 with such members being individually controlled. One of the heating elements can extend into one end of a roller tube 24, while a second heating element extends into the other end of the same roller tube. The temperature control knob 52 may control the heating elements in the cooking area 32 and the temperature control knob 50 (not shown) may control the heating elements in the cooking area 28. The knobs 50 and 52 and the related circuitry can therefore control the two heating elements so that the temperature of one heating element differs from that of the other heating element. Hence, the temperature in the cooking area or section 28 can be at a different temperature than that in the cooking area or section 32, to suit the temperature needs for cooking two different kinds of food.

The grease drip tray 42 is provided which rests on a floor section 202 beneath the roller tubes 24 to catch grease and fluids dripping therefrom. The drip tray 42 may be easily grasped and slid along the floor section 202 to be removed from the housing 22. The tray 42 can then be emptied and cleaned. The clearance beneath the roller tubes 24 allows the drip tray 42 to then be slid along the floor section 202 back into a position to capture grease and other droppings.

The housing 22 further comprises an integral L-shaped member 204, formed of rigid material, illustrated in this embodiment to be of stainless steel. The L-member 204 has a rear wall 206 that extends downward into a horizontal flanged foot 208 that is secured to the bottom of a base channel 210 by screws 212. The L-shaped housing member 204 further comprises a horizontal wall 214 that extends forward from the top of the rear wall 206. At the front of the horizontal wall 214 is an integral U-shaped channel 216. The housing also comprises a central horizontal base sheet 218 with the front end of the base sheet 218 extending into an integral U-shaped channel 220. The rear of the base sheet 218 extends into the base channel 210. The housing 22 may be provided with legs 222.

The roller tubes 24 have cylindrical end sections at one end and at the other end a sprocket or gear (not shown). The roller tubes 24 are rotated by use of a roller tube drive assembly (not shown). The drive assembly may include a driving sprocket (also not shown) that is drivingly engaged with a shaft of a motor 224. The motor 224 is mounted by any known means in the housing 22. The drive assembly may further include other components such as an idler sprocket or gear and a drive chain. Further operation and construction of the drive assembly is shown and described in the previously cited patent. Additionally, the manner in which the roller tubes 24 are heated and the circuitry employed for such heating is also described in such patent.

Operation Of Divider Ensemble With Roller Grill

As noted, the section divider ensemble can be assembled in a production facility such as a factory or plant, by securing the brackets 70, 72, 78 and 80 to the side walls 38 and 40 by spot welding for example. However, the section divider ensemble 26 also lends itself to being retrofitted on existing roller grills, such as existing in the field. For installation in the field, the brackets 70, 72, 78 and 80 can be attached to the side walls 38 and 40 such as by adhesive. Once the brackets 70, 72, 78, and 80 are attached, the front and back mounting braces 68 and 76 are positioned so that the notches 116 and 118 are manipulated to receive the projections 122, 124, 128 and 130. When the front and back mounting braces 68 and 76 are in place, one or more of the divider members 84 can be positioned into aligned brace slots 74 and 82. Further, a label 86 can be placed on the front mounting brace 68 to indicate to an operator or a customer what product is being cooked or warmed in the particular cooking area 28, 30, or 32. The label 86 can be a magnetized piece of material that can be releasably held in place on the front mounting brace 68. This allows different labels 86 to be used interchangeably as the types of foods being cooked varies. However, other attaching methods can be employed for the labels such as releasable adhesive, glue, or cards with the product description placed in slotted support brackets.

As can be appreciated, in operation of the roller grill assembly 20 one type of food product, such as hot dogs, can be placed on the roller tubes 24 located in cooking area 28 and a separate type of food product, e.g., corn dogs, egg rolls, hamburgers and sausages that have a tubular shape, food wrapped in tortillas, and tubular pastry rolls, can be placed on the roller tubes 24 located in the cooking area 30. This allows an operator to initially place the same type of food products, such as hot dogs, in the cooking area 28 and then remove them when cooked. Once the cooked hot dogs are removed, the operator can place additional uncooked hot dogs in the same cooking area 28. When two divider members 84 are used, another type of food can be cooked in the separate cooking area 32. The divider ensemble 26 thus helps keep juices and particles from food cooked in cooking area 28 from contacting foods cooked in the other cooking areas 30 and 32, and vice versa. The operator will thus be able to cook the hot dogs in the cooking area 28 without being concerned about the drippings or portions of the food in the cooking area 30 or 32 from contacting or being imparted upon the hot dogs to alter their flavor.

An operator can cook two entirely different flavors of food in the separate cooking areas 28 and 32, while keeping the juices and particles of those foods from altering or modifying the flavor of each other, or likewise use the third cooking area 30. The divider ensemble 26 allows the operator to easily remember which cooking area is being used for the particular food product, and thus to prevent the operator from mistakenly placing one of the types of food products to be cooked on area 28 and area 32, and vice versa, or area 30 when two divider members 84 are used. Also, the product identifying labels 86 help another operator know what food product was being cooked in each of the cooking areas 28, 30, or 32.

As can be appreciated from the foregoing, although one divider ensemble 26 has been discussed that divides the assembly 20 into three cooking areas, it should be recognized and understood that additional divider members 84 can also be placed about the roller tubes 24 in the same fashion as shown and spaced from the other divider members 84 so as to divide the assembly into many separate cooking areas. Further, only one divider member 84 could be used to divide the cooking area into two large cooking areas. It is also contemplated and possible that the cooking areas 28, 30, and 32 may be sectioned into equal areas or that one cooking area will be larger than the other cooking area. The mounting braces 68 and 76 may also be constructed each having only one opening 74. In this manner, the roller grill will only be separated into two cooking areas. As can be further appreciated, the divider ensemble 26 can be easily moved, installed, or repositioned. It is also possible that the divider ensemble 26 can be produced in a kit form in order to be used with existing roller grill assemblies.

Although the series of roller tubes 24 are shown mounted at an angle relative to the housing 22 it should be understood that the roller tubes 24 may also be aligned parallel to each other and on a horizontal plane or with roller tubes 24 that angle downwardly from the front to the rear of the housing 22 and the ensemble 26 can be used equally well with such orientations of the roller tubes 24.

OTHER EMBODIMENTS

Figure 11:
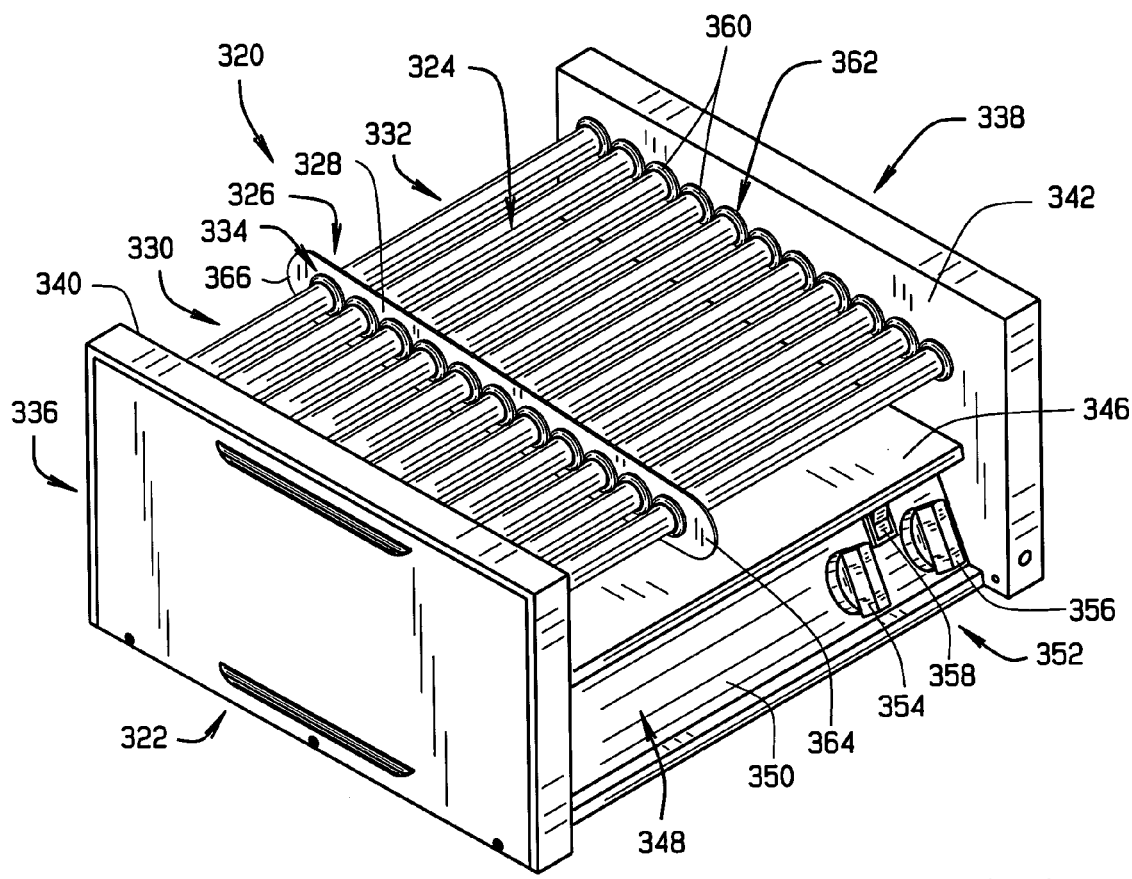
FIG. 11 is an orthogonal projection of a roller grill assembly having a section divider constructed according to the present invention.
Figure 12:
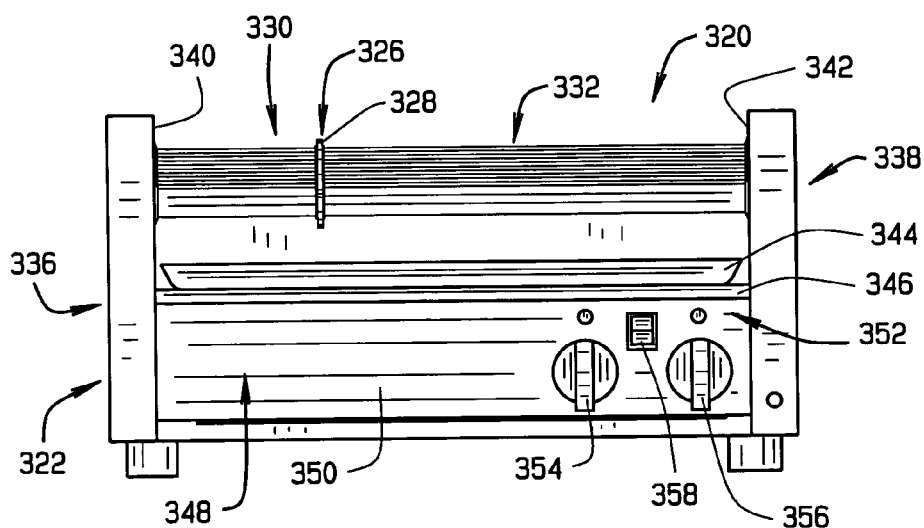
FIG. 12 is a front elevation of the divider for the roller grill assembly of FIG. 11.
Figure 13:
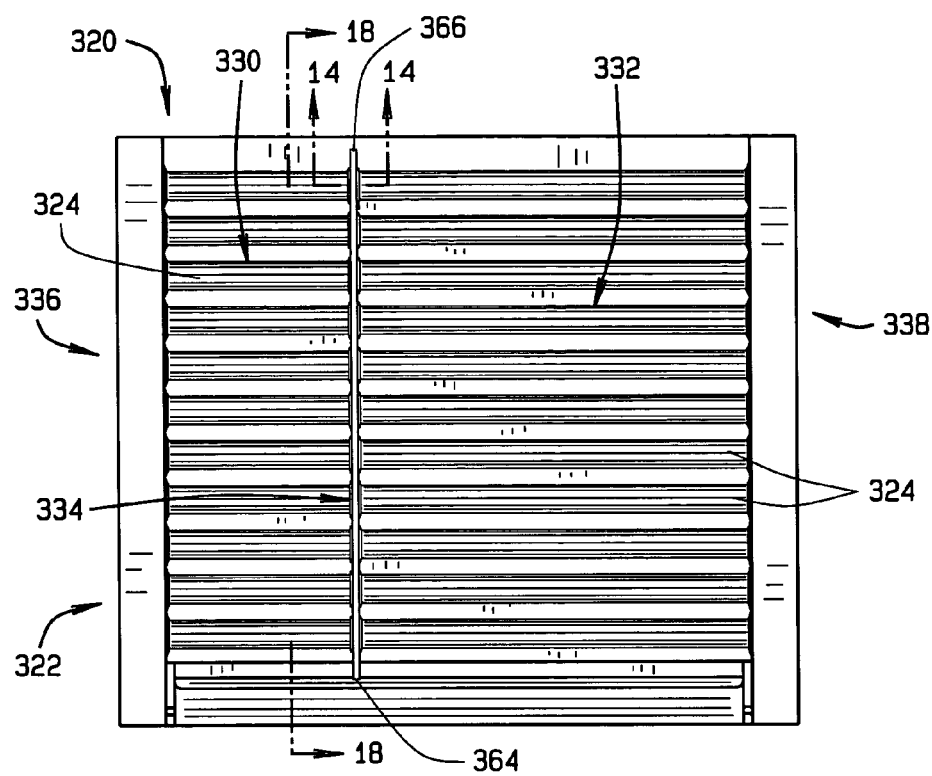
FIG. 13 is a top plan view of the assembly of FIG. 11 showing the divider.

Turning now to other embodiments, with reference now to FIGS. 11-13, a roller grill assembly for cooking human food is generally designated by numeral 320. The assembly 320 generally comprises a main housing 322, upon which are mounted a plurality of rotatable tubular cooking members 324 which are adapted to being heated, as will be explained fully herein. The assembly 320 further comprises a divider ensemble 326 comprising a divider partition wall member 328 for separating the cooking tubes 324 into two cooking areas or sections 330 and 332. The divider ensemble 326 also comprises roller tube bearing/sealing sub-assemblies 334 for providing a seal of the partition wall 328 about the tubes 324. The section divider ensemble 326 can be used with roller tube assemblies of various types wherein the tubes rotate relative to a housing to which they are mounted. The housing 322 can vary in size and configuration. A detailed example of such a roller grill assembly is shown in U.S. Pat. No. 6,393,971, which is assigned to the assignee of this application, and said patent is incorporated herein by this reference. The various manners or constructions in which the cooking tubes 324 are rotated or operated are also described in detail in such referenced patent.

The housing 322 comprises two generally rectangular side support frames 336 and 338. Each of the side support frames 336 and 338 are fabricated from a rigid material such as stainless steel and can be stamped so that they each have an interior sidewall 340 and 342, respectively. A separate grease drip tray 344 is provided which rests on a floor section 346 beneath the roller tubes 324 to catch grease and fluids dripping there from. Towards its front, the housing 322 comprises a control panel 348 that has a middle wall section 350 that extends rearwardly at an angle of about 15° to 20°. A control assembly 352 is positioned on the control panel 348 and comprises a pair of temperature control knobs 354 and 356, which are rotatable for selectively controlling the temperature of the roller tubes 324. A power switch 358 is also mounted to the control panel 348 and is used to power the roller grill 320. Each of the frame sidewalls 336 and 338 has a plurality of holes 360 for mounting the rotatable cooking tubes 324 into tube sealing sub-assemblies 362. The construction and composition of the tube sealing sub-assemblies 362 will be described in more detail herein. Further, the partition wall member 328 of the divider ensemble 326 may be constructed of or formed from metal such as stainless steel, or other suitable material such as polytetrafluoroethylene. The partition 328 is elongated and has a front or distal end 364, and a rear or proximal end 366, both of which are illustrated as having a generally semicircular shape. The ends 364 and 366 can have other shapes, but curved ends are preferred.

Figures 14, 16:
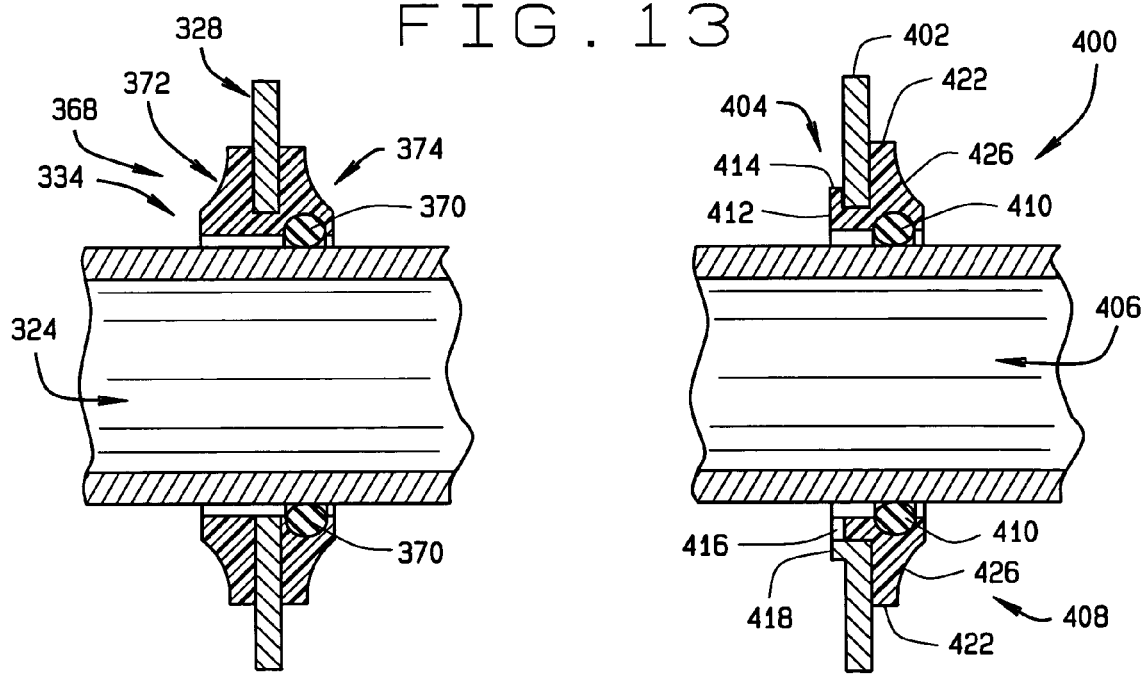
FIG. 14 is a section of part of the assembly of FIG. 11 showing a roller tube extending through a sealing member mounted about a hole in the divider.
FIG. 16 is a view of a roller tube extending through an alternate sealing member assembly mounted about a hole in the divider.
Figure 15:
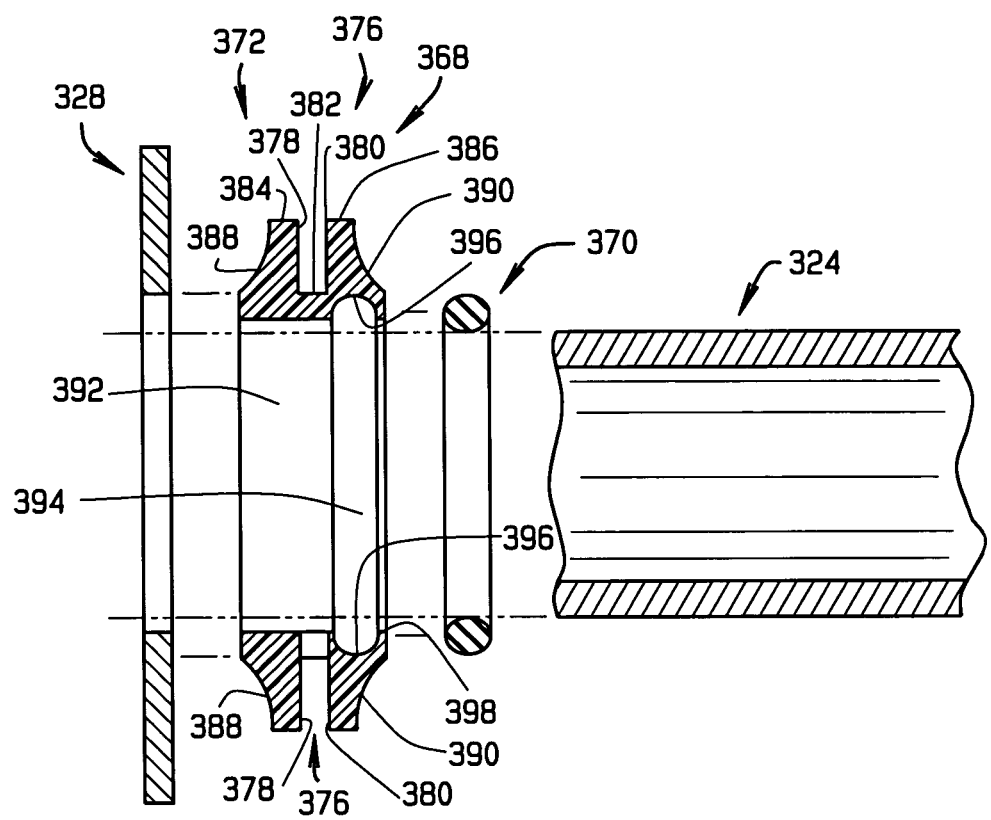
FIG. 15 is an exploded view of the sealing assembly of FIG. 14.

Referring now to FIGS. 14 and 15, the construction of one of the roller tube bearing/sealing sub-assemblies 334 is now described. The sub-assembly 334 comprises a bearing seal 368 and a sealing member or an O-ring 370. The bearing seal 368 may be constructed of any suitable plastic material such as polytetrafluoroethylene. The O-ring 370 may be formed from any rubber-like material such as silicone rubber. Each bearing seal 368 has a pair of annular rim sections 372 and 374 with an annular notch 376 positioned there between. The annular notch 376 has a pair of generally flat inwardly facing side walls 378 and 380 and an annular notch floor 382 that extends generally perpendicular to the side walls 378 and 380. Each annular rim section 372 and 374 has an annular outer surface 384 and 386, respectively, that extend generally perpendicular to the side walls 378 and 380, respectively. Further, each rim 372 and 374 has an outwardly facing tapered surface 388 and 390 which slopes inwardly from the outer surfaces 384 and 386, respectively.

The bearing seal 368 has a generally cylindrical bore 392 and a bore section 394. The bore section 394 has an annular semi-circular surface 396 that is sized and shaped to receive the outer curved surface of the O-ring 370. The bearing seal 368 further includes a cylindrical lip section 398 that is about the same diameter as the bore 392 and is used to help retain the O-ring 370 in place. In the installed position of FIG. 14, the tube 324 extends through the cylindrical bore 392 and through the O-ring 370. The inner surface of the O-ring 370 fits snugly against the outer surface of the tube 324 to thus provide a seal there against to resist the flow of juice, grease, and food particles from one side of the O-ring 370 to the other side thereof. Thus, the seal of the O-ring 370 helps to resist the flow of grease and the like through the bearing seal 368.

As can be appreciated, in operation of the roller grill assembly 320 one type of food product, such as hot dogs, can be placed on the roller tubes 324 located in cooking area 330 and a separate type of food product, e.g., corn dogs, egg rolls, hamburgers and sausages that have a tubular shape, food wrapped in tortillas, and tubular pastry rolls, can be placed on the roller tubes 324 located in the cooking area 332. This allows an operator to initially place the same type of food products, such as hot dogs, in the cooking area 330 and then remove them when cooked. Once the cooked hot dogs are removed, the operator can place additional uncooked hot dogs in the same cooking area 330. The divider ensemble 326 resists or prevents the flow of juices and particles from food cooked in cooking area 330 from flowing or moving along the tubes 324 into the other cooking area 332 and vice versa. The operator will thus be able to cook the hot dogs in the cooking area 330 without being concerned about the drippings or portions of the food in the cooking area 332 from contacting or being imparted upon the hot dogs to alter their flavor. Likewise, the divider ensemble 326 with its sealing sub-assemblies 334 and the partition wall 328 resists the flow of juice and particles from the hot dogs in the cooking area 330 along the surfaces of tubes 324 into the cooking area 332, so that the food flavor in the cooking area 332 is not altered thereby.

Therefore, an operator can cook two entirely different flavors of food in the separate cooking areas 330 and 332, while keeping the juices and particles of those foods from altering or modifying the flavor of each other. The divider ensemble 326 allows the operator to easily remember which cooking area is being used for the particular food product, and thus to prevent the operator from mistakenly placing one of the types of food products to be cooked on area 330 in area 332, and vice versa.

Figure 17:
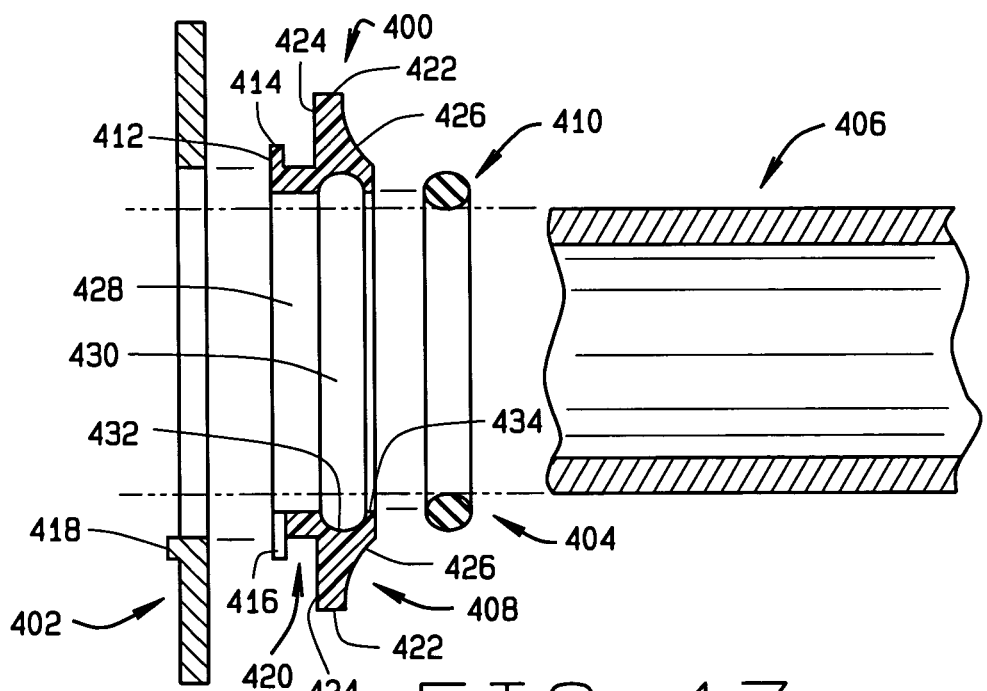
FIG. 17 is an exploded view of the sealing assembly of FIG. 15.

FIGS. 16 and 17 show an alternate embodiment of a sealing sub-assembly 400 to fit with a partition wall 402 of a divider ensemble 404. Each sealing sub-assembly 400 fits about a corresponding roller tube 406, such as shown in FIG. 16. As seen more clearly in the exploded view of FIG. 17, the alternate sub-assembly 400 comprises a bearing seal 408 and an O-ring 410. The bearing seal 408 can be of plastic, such as polytetrafluoroethylene, and the O-ring 410 can be of rubber-like material, such as silicon rubber. The bearing seal 408 has an outer cylindrical sleeve 412 that has an annular flange 414 with the flange 414 having a notch 416. The wall 402 has an integral nib 418 that projects outwardly from the wall surface 402. The notch 416 is sized to snugly receive the nib 418 to prevent rotation of the bearing seal 408 relative to the divider wall 402 when the tube 406 rotates.

The cylindrical sleeve 412 extends into an annular rim section 420, which has a flat annular outer surface 422, a substantially flat left side surface 424, and a curved tapered right side surface 426. The bearing seal 408 further has a cylindrical bore 428. The cylindrical bore 428 extends into a bore section 430 that has an arcuate semi-circular surface 432 shaped to receive the outer curved surface of the O-ring 410. The bore section 430 then extends into a bore lip section 434 which has about the same diameter as the cylindrical bore 428.

Figure 18:
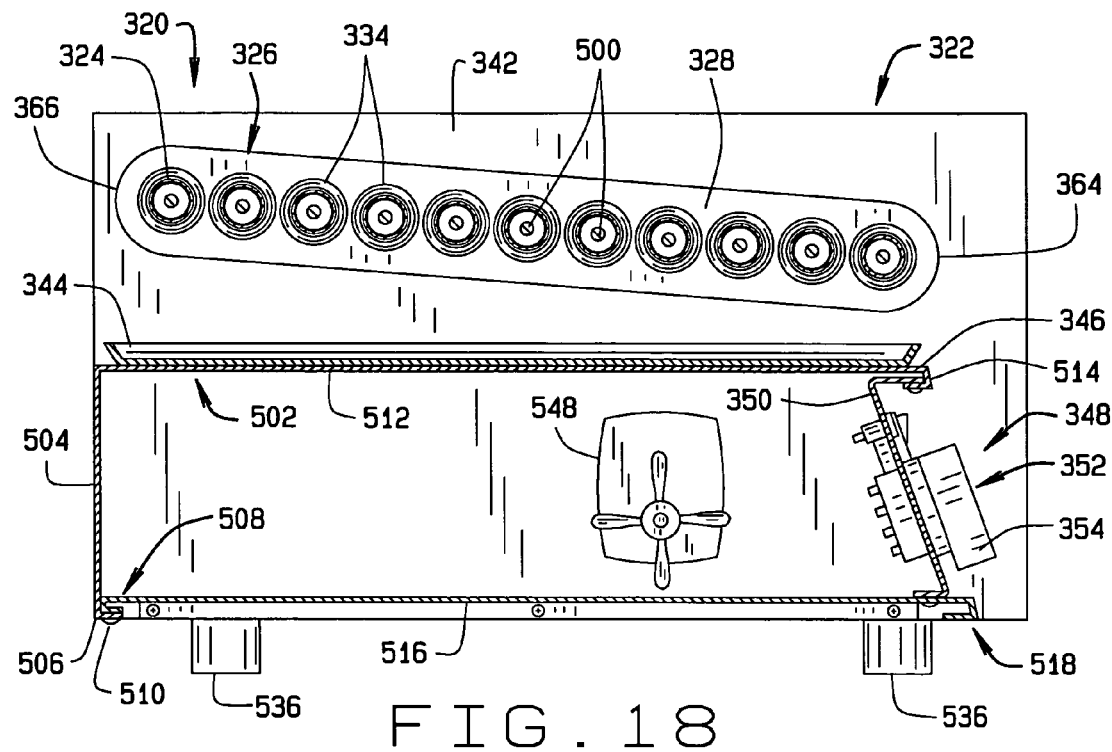
FIG. 18 is a section of the assembly taken on the line 18-18 of FIG. 13.

FIG. 18 illustrates a partial cross-sectional view of the roller grill assembly 320 taken along the plane of line 18-18 of FIG. 13. The roller grill assembly 320 comprises the main housing 322, upon which are mounted the plurality of rotatable tubular cooking members 324 which are adapted to being heated by heating elements 500. Further, the heating elements 500 can take the form of the heating elements shown and disclosed in U.S. Pat. No. 6,393,971. Although not shown in detail, the heating elements 500 can comprise a pair of elements within each of the cooking members with such members being individually controlled. One of the heating elements can extend into one end of a roller tube 324, while a second heating element extends into the other end of the same roller tube. The position to which each such element extends can be the same for each of the roller tubes 324 so that the section divider ensemble 326 can be placed at a location approximately between the distal ends of those heating elements. The temperature control knob 354 may control the heating elements in the cooking area 330 and the temperature control knob 356 may control the heating elements in the cooking area 332. The knobs 354 and 356 and the related circuitry can therefore control the two heating elements so that the temperature of one heating element differs from that of the other heating element. Hence, the temperature in the cooking area or section 330 can be at a different temperature than that in the cooking area or section 332, to suit the temperature needs for cooking two different kinds of food.

The assembly 320 further comprises the divider ensemble 326 comprising a divider partition wall member 328 for separating the cooking tubes 324 into the two cooking areas. The divider ensemble 326 also comprises roller tube bearing/sealing sub-assemblies 334 for providing a seal of the partition wall 328 about the tubes 324. The grease drip tray 344 is provided which rests on the floor section 346 beneath the roller tubes 324 to catch grease and fluids dripping there from. In the installed position, the lower edge of the divider partition wall 328 is spaced a sufficient clearance distance, preferably such as about 1-¼ to 1-¾ inches, above the drip tray 344. The lowest point of the divider wall 328 preferably has about 1-½ to 2 inches clearance above the floor section 346. Such clearance allows drip tray 344 to be easily grasped and slid along the upper surface of the floor section 346 to be removed from the housing 322. The tray 344 can then be emptied and cleaned. The clearance beneath the roller tubes 324 allows the drip tray 344 to then be slid along the floor section 346 back into a position to capture grease and other droppings.

The housing 322 further comprises an integral L-shaped member 502, formed of rigid material, illustrated in this embodiment to be of stainless steel. The L-member 502 has a rear wall 504 which extends downward into a horizontal flanged foot 506 that is secured to the bottom of a base channel 508 by screws 510. The L-shaped housing member 502 further comprises a horizontal wall 512 that extends forward from the top of the rear wall 504. At the front of the horizontal wall 512 is an integral U-shaped channel 514. The housing also comprises a central horizontal base sheet 516 with the front end of the base sheet 516 extending into an integral U-shaped channel 518. The rear of the base sheet 516 extends into the base channel 508.

Figure 19:
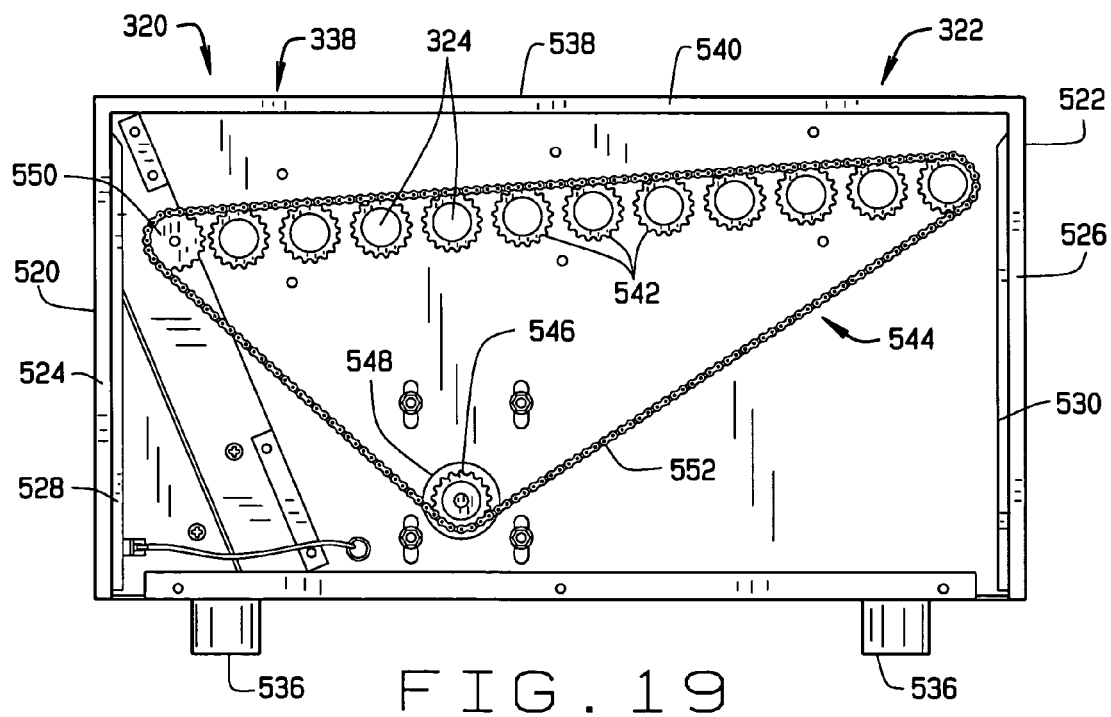
FIG. 19 is a side elevation of the left side of the assembly as viewed to the left of FIG. 11, with the geartrain cover and heating element connections removed.

Turning now to FIG. 19, the side frame 338 of the housing 322 is further shown to have a front facing frame wall 520 and a rear facing frame wall 522. The front frame wall 520 and the rear frame wall 522 each have projecting from their outer edges a channel 524 and 526, respectively, with inwardly extending lip flanges 528 and 530 projecting respectively from the channels 524 and 526 at their ends. A floor frame wall 532 has at its outer end an upwardly extending flange 534. The floor frame wall 532 may have feet 536 attached thereto. A frame top wall 538 has a vertical flange that depends there from.

The roller tubes 324 have cylindrical end sections at their left ends as viewed looking at FIGS. 11-13, while at their right ends, each of the roller tubes has formed integrally therewith a sprocket or gear 542 which is part of a roller tube drive assembly 544. The drive assembly 544 further comprises a driving sprocket 546 that is drivingly engaged with a shaft of a motor 548. The motor 548 is mounted by any known means in the housing 322. The drive assembly 544 further comprises an idler sprocket or gear 550 and a drive chain 552. The drive chain 552 extends from the drive sprocket 546 on to the idler sprocket 550 and thence to the tube sprockets 542. Further operation and construction of the drive assembly 544 is shown and described in the previously cited patent. Additionally, the manner in which the roller tubes 324 are heated and the circuitry employed for such heating is also described in such patent.

Figure 20:
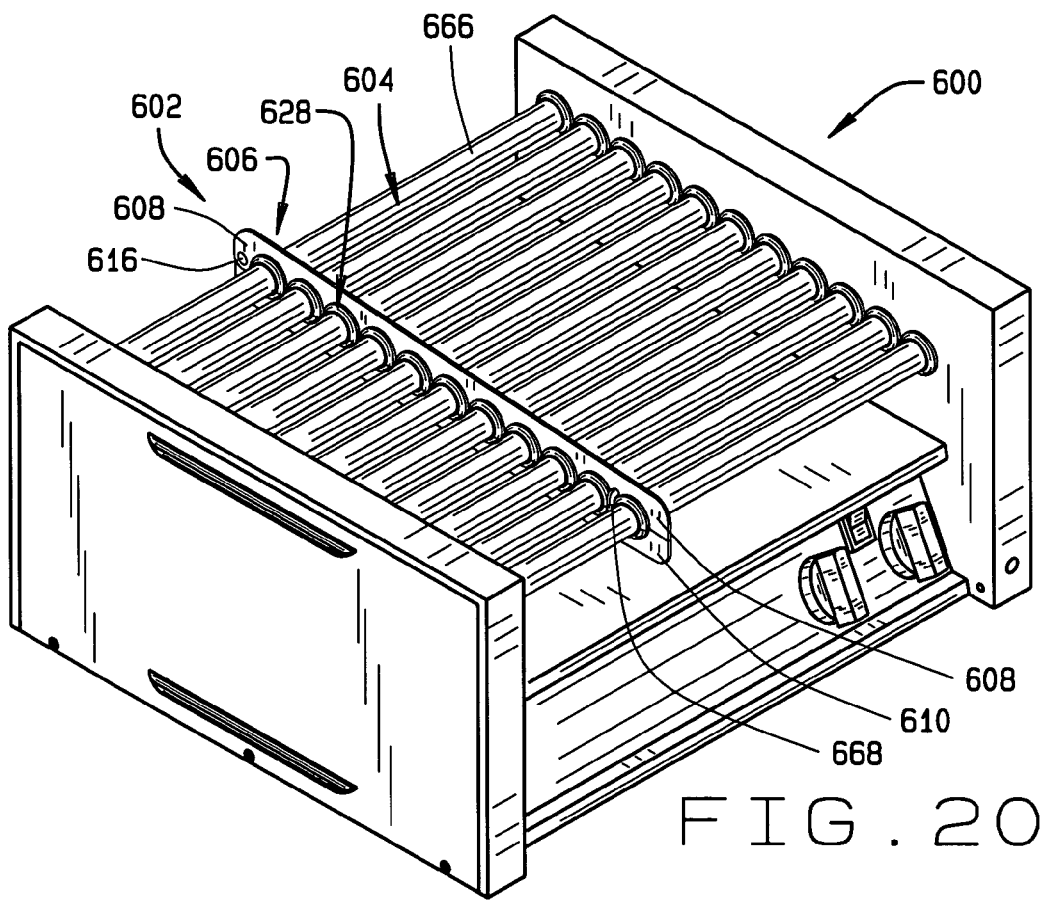
FIG. 20 is an orthogonal projection of a roller grill assembly having a modified section divider of the invention.
Figure 21:
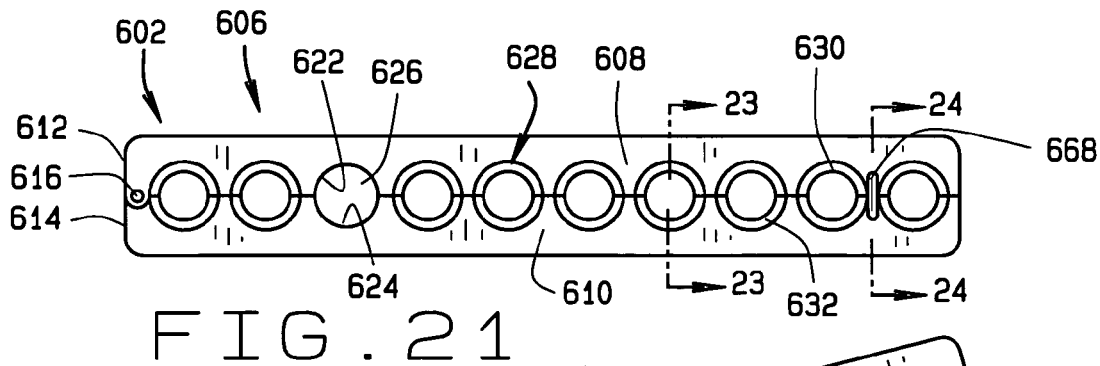
FIG. 21 is a side elevation of the alternate divider of FIG. 20, shown in the closed position with one of the bearing/sealing sub-assemblies shown removed.
Figure 22:
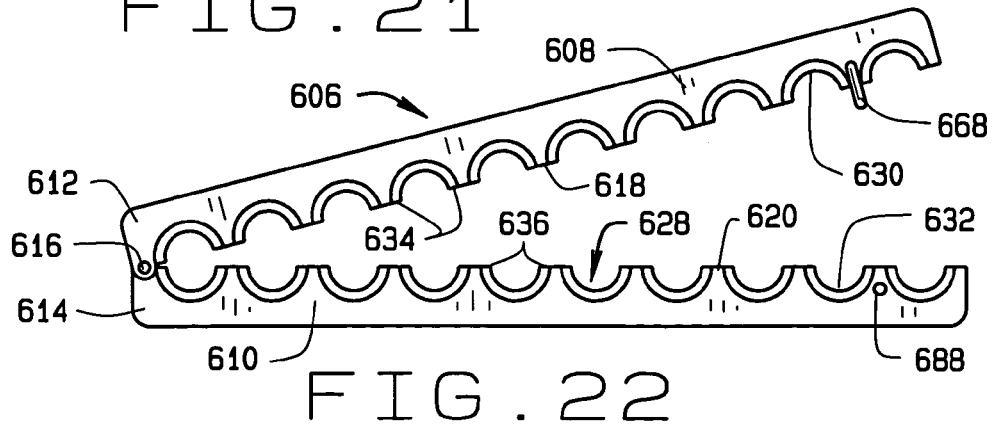
FIG. 22 is a side elevation of the modified divider of FIG. 10, shown in the open position.

Another embodiment of a roller grill for cooking human food having a section divider ensemble is depicted in FIGS. 20-24A. With particular reference to FIGS. 20-22, a roller grill assembly 600 has an ensemble 602 which is mounted to a plurality of roller tubes 604. The ensemble 602 has a divider partition wall 606 formed of an upper wall section 608 and a lower wall section 610. The wall sections 608 and 610 can be of stainless steel. At the left side of FIGS. 20-22, a pair of proximal ends 612 and 614 of the walls 608 and 610 is pivotally connected as by a rivet 616 that extends through aligned openings (not shown) in the walls 608 and 610. The rivet 616 allows the wall sections 608 and 610 to be pivoted away from one another to an open position, such as shown in FIG. 22. The wall sections 608 and 610 have inner edges 618 and 620, respectively. The edges 618 and 620 have formed therealong a plurality of semi-circular notches 622 and 624, respectively, as seen more clearly for the third opening from the left in FIG. 21. When the wall sections 608 and 610 are closed together as in FIG. 21, the inner edges 618 and 620 are in approximate contact, and the notches 622 and 624 are joined together so that a plurality of circular bores 626 extend along the partition wall 606. The ensemble 602 has a plurality of bearing seals 628 that fit with each of the pairs of semi-circular notches 622 and 624. Each bearing seal 628 comprises an upper semi-annular bearing section or upper bearing/sealing member 630 and a lower semi-annular bearing section or lower bearing/sealing member 632. The upper semi-annular sections 630 have a pair of flat edges 634 and the lower sections 632 have a pair of flat edges 636. The edges 634 are adapted to abut the flat edges 636 of the lower semi-annular section 632 when the ensemble 602 is in the closed position as is illustrated in FIG. 21.

Figure 23:
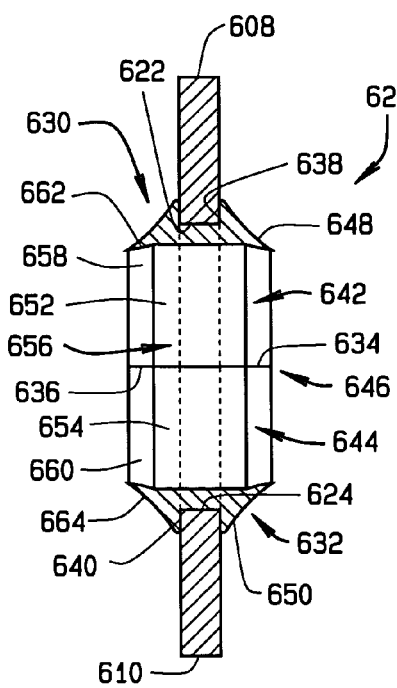
FIG. 23 is a section of the modified divider of FIGS. 20-22, taken on the line 23-23 of FIG. 21.

With particular reference now to FIG. 23, each of the sections 630 and 632 have a semi-circular notch 638 and 640, respectively, that extends along the outside thereof to receive the edges of semi-circular notches 622 and 624 in the partition walls 608 and 610. The upper semi-annular section 630 and the lower semi-annular section 632 each have semi-circular passageways 642 and 644, respectively, that together form a closed opening 646 which can receive a tube 604. Each of the bearing sections 630 and 632 also has semi-annular sloped outer surfaces 648 and 650, respectively. The passageways 642 and 644 have central semi-cylindrical bores 652 and 654, respectively, that when joined together in the closed position of FIGS. 21 and 23, form a cylindrical bore section 656. The bore sections 652 and 654 further extend, as seen in FIG. 23, into a pair of bore sections 658 and 660, respectively. The bore sections 658 and 660 are tapered to have a smaller radius at their outer edge than at their inner edge so that the outer parts of the bearing sections 630 and 632 that extend thereabout have semi-annular tapered gripping lips 662 and 664, which together have an annular shape. When the partition wall sections 608 and 610 are closed about the tubes 604, the gripping lips 662 and 664 press against each outer surface 666 (FIG. 20) of the tubes 604 to prevent the passage of drippings and particles from food products being cooked on either side of the divider ensemble 602.

Figure 24:
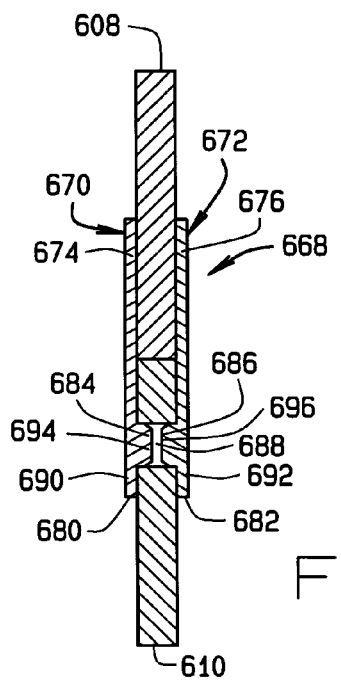
FIG. 24 is a section of the modified divider of FIGS. 20-22, taken on the line 24-24 of FIG. 21, and depicting an enlarged view of the latching ensemble.
Figure 24A:
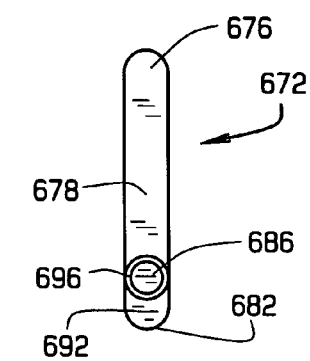
FIG. 24A is a side elevation of an isolated latching tong of the latching ensemble.

Referring again to FIGS. 20 and 21, a latch assembly 668 is employed to hold the two wall sections 608 and 610 together in the closed or locked position. With particular reference now to FIGS. 24 and 24A, the latch assembly 668 comprises a pair of latch tongs 670 and 672. As seen in FIG. 24, and in the isolated view of the tong 672 in FIG. 24A, each of the latch tongs 670 and 672 has a proximal section 674 and 676, respectively. Each of the proximal sections 674 and 676 has a flat inner surface (shown as 678 for the tong 672 in FIG. 24A) that fits substantially flush against the substantially flat outer surfaces of the divider wall sections 608 and 610 when the latch assembly 668 is in the closed position. The tong sections 670 and 672 can be secured or held in place by spot welding the tong sections 670 and 672 to the wall section 608. Each of the tongs 670 and 672 has a distal end 680 and 682, respectively, and each of the distal ends 680 and 682 has an inwardly projecting circular nib 684 and 686, respectively. The nibs 684 and 686 are adapted to fit snugly into a conforming circular bore 688 that is formed in the wall section 610 and is further depicted in FIG. 22. Each of the tongs 670 and 672 has a distal leg portion 690 and 692, respectively, which are positioned beneath each of the nibs 684 and 686. The distal leg portions 690 and 692 are adapted to abut or contact the wall section 610 when the two wall sections 608 and 610 are in the closed position. The nibs 684 and 686 further have outer edges 694 and 696, respectively, which are chamfered to facilitate opening or closing of the wall sections 608 and 610. For example, when the wall sections 608 and 610 are moved toward each other into the locked position, the chamfered surfaces 694 and 696 of the nibs 684 and 686 are wedged apart by the wall section 610. When the nibs 684 and 686 become aligned with the bore 688, the spring action of the tongs 670 and 672 moves the nibs 684 and 686 into a locked position within bore 688, as shown in FIG. 24, to hold the walls 608 and 610 together. To disengage the latch assembly 668, the leg portions 690 and 692 are pried away from the wall section 610 to move the nibs 684 and 686 away from one another. The wall sections 608 and 610 can then be pivoted away from each other so that the chamfered surfaces 694 and 696 of the nibs 684 and 686 assist or allow the nibs 684 and 686 to be disengaged from bore 688. In this manner, the ensemble 602 lends itself to easy installation with the assembly 600 without having to disengage the tubes 604 from the assembly 600.

As can be appreciated, for installation of the ensemble 602, the upper divider wall section 608 is pivoted away from the lower wall section 610 so that the section 610 can be slid beneath the tubes 604. Each of the lower bearing/seal members 632 is then aligned with a corresponding tube 604. The wall section 610 is then moved so that the corresponding tubes 604 are received within the bearing/seal members 632 with the bearing/sealing members 632 are pressed against the tube surfaces 666. The divider wall 608 is then pivoted downwardly until the bearing/seals 630 press against the tube surfaces 666 and the nibs 684 and 686 of latch tongs 670 and 672 are received in latching arrangement within the bore 688 of the lower wall 610. To disengage the ensemble 602, the latch 668 can be opened by pivoting the upper wall section 608 upwardly so that the lower wall section 610 can be removed from underneath the tubes 604.

Figure 27:
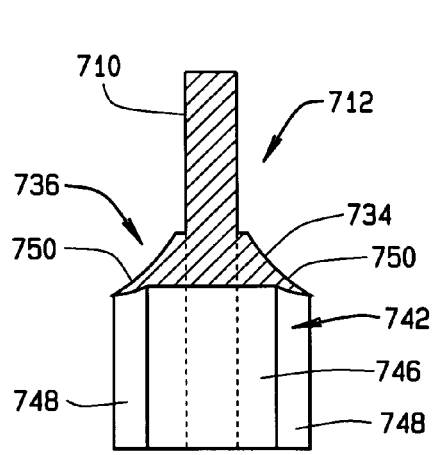
FIG. 27 is a section of the divider of FIGS. 25-26, taken on the line 27-27 of FIG. 26, but not showing the lower right end of the divider as seen in FIG. 26.
Figure 25:
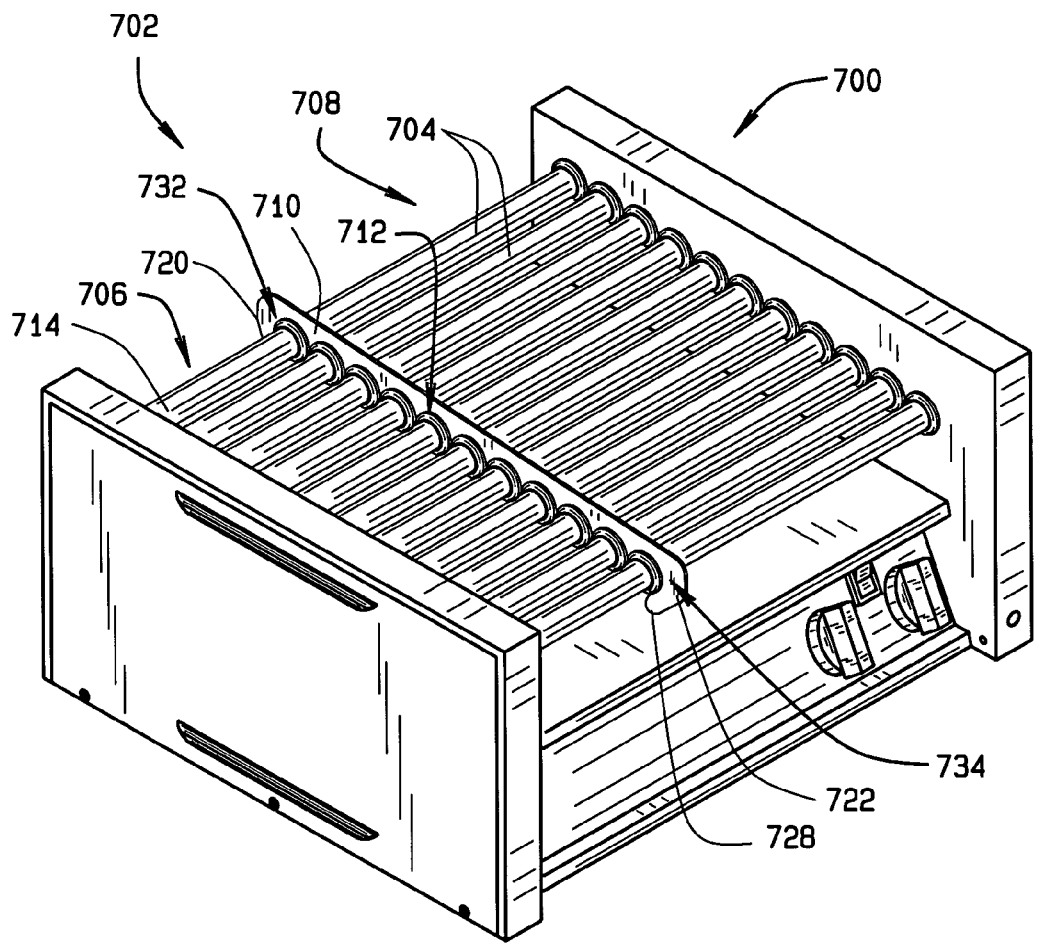
FIG. 25 is an orthogonal projection of a roller grill assembly having yet another modified divider of the invention.
Figure 26:
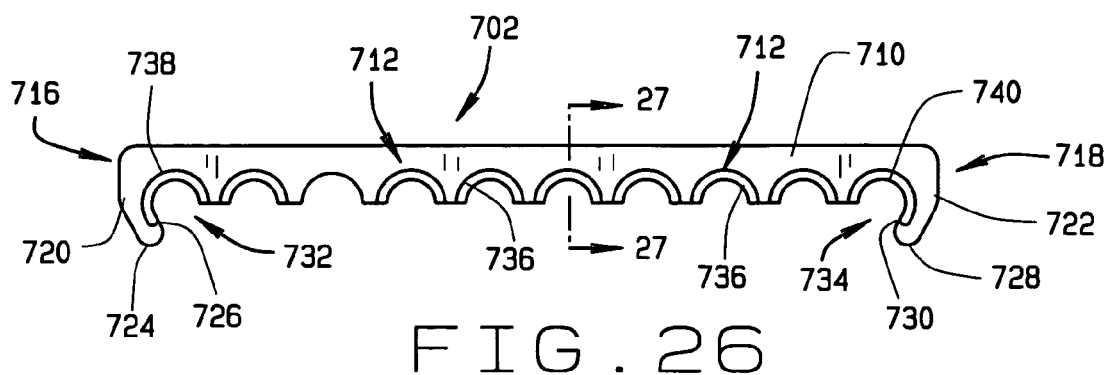
FIG. 26 is a side elevation of the divider of FIG. 25, with one of the bearing sub-assemblies shown removed.

Now attention is directed to another embodiment of a roller grill for cooking human food having a section divider ensemble that is illustrated in FIGS. 25-27. A roller grill assembly 700 is shown having a divider ensemble 702 mounted to a plurality of heated roller tubes 704. The ensemble 702 is used to divide the roller grill assembly 700 into two different cooking areas 706 and 708. In particular, the cooking area 706 may be used to cook food products having a particular length. The cooking area 708 may be used to cook food products having a different length than those of the food products being cooked in the cooking area 706. The ensemble 702 comprises a divider partition wall 710 having bearing sub-assemblies 712. The bearing sub-assemblies 712 are adapted to fit on cooking surfaces 714 of the roller tubes 704. In this particular embodiment, the ensemble 702 is described as being an integral piece of plastic, such as polytetrafluoroethylene, made such as by injection molding or other molding process.

Referring now in particular to FIG. 26, the partition wall 710 has a pair of opposite ends 716 and 718 each having an inwardly slanted leg 720 and 722, respectively. The leg 720 has a generally semi-circular end 724 having an inner edge 726. The other leg 722 also has a generally semi-circular end 728 and an inner edge 730. The ensemble 702 further comprises the bearing sub-assemblies 712 which are preferably unitary with the partition wall 710. The ensemble 702 further comprises two end bearing sub-assemblies 732 and 734 with the sub-assembly 732 being at the end 724 and the sub-assembly 734 being at the end 728. The bearing sub-assemblies 712 are positioned between the end sub-assemblies 732 and 734. The sub-assemblies 712 each comprise a bearing/seal 736. The end sub-assembly 732 has a bearing/seal 738 and the end sub-assembly 734 has a bearing/seal 740.

A sectional view of the bearing seal 736 of the sub-assembly 712 is shown in FIG. 27. The bearing seal 736 is preferably molded to be unitary or one piece with the partition wall 710. The bearing seal 736 has a semi-circular passageway 742 which can receive the roller tube 704. Each of the bearing/sealing members 736 has semi-annular sloped outer surfaces 744 and the passageway 742 has a central semi-cylindrical bore 746. The bore 746 extends outwardly into semi-circular bore sections 748. The bore sections 748 are tapered to be of smaller radius at their outer edge than at their inner edge where the bore sections 748 join the bore section 746. The bearing 736 further has semi-annular tapered gripping lips or flanges 750. When the ensemble 702 is placed about the tubes 704 the gripping lips 750 press against the outer surface 714 of the tubes 704 to prevent the passage of drippings and particles from food products cooked in the cooking areas 706 and 708 from passing from one side of the divider ensemble 702 to the other side.

The end bearing assembly 732 has the bearing/seal 738 which has the same cross-sectional configuration as the bearing members 712, except that the bearing/seal 738 has a curvature greater than a semi-circular shape, as can be seen in FIG. 26, to extend along the inside edge 726 of the leg 720. Further, the end bearing assembly 734 has the bearing/seal 740 constructed similar to the bearing/seal 738. The end bearing assembly 734 also extends along the inside edge 730 of the leg 722.

In installation, the ensemble 702 can be placed above the roller tubes 704 and then the ensemble 702 can then be tilted either so that its rear leg 720 or its forward leg 722 is lowered. For purposes of illustration, the installation of the ensemble 702 will be given assuming that the front leg 722 is being tilted down. The leg 722 can be moved to a position forward of the front most tube 704 of the assembly 700. The ensemble 702 can then be moved at an angle so that the forward most tube 704 is moved to be received within bearing/seal 740 so that its gripping flanges 750 rest against the forward most tube. The ensemble 702 can then be pivoted to lower the other leg 720 so that the other tubes 704 are received within the bearing/seals 736 with the rearmost tube 704 being received within bearing/seal 732 so that the gripping lips 750 of the bearing/seals 736 and 750 press against the tubes 704. This ensemble 702 lends itself to installation to assemblies 700 that are in the field, as it can be installed without having to disengage the roller tubes 704 from the assembly 700.

Figure 27A:
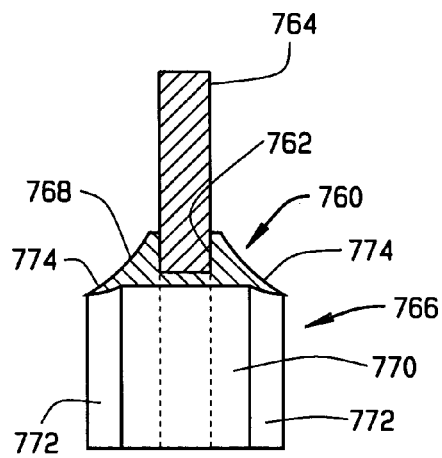
FIG. 27A is a section of a modification of the divider of FIG. 27, wherein the partition wall of the divider is a separate component from the bearing/sealing member.

The ensemble can also be constructed with the bearing component being separate from the partition wall 710. This particular construction is illustrated in FIG. 27A. With reference now to FIG. 27A, a bearing/assembly or bearing member 760 has a semi-circular notch 762 to receive edges of semi-circular notches in a partition wall 764. The partition wall 764 in this embodiment would be constructed from stainless steel and the bearing member 760 would be constructed from any suitable plastic material such as polytetrafluoroethylene.

In FIG. 27A, the bearing/seal 760 likewise has a semi-circular passageway 766", semi-annular sloped outer surfaces 768, and a central semi-cylindrical bore 770 that extends outwardly into semi-circular bore sections 772. The bore sections 772 are likewise tapered to be of smaller radius at their outer edges than at their inner edges, and gripping lips 774 are provided at the openings of the bore sections 772. The lips 774 are capable of pressing against the outer tube surfaces, for example outer tube surfaces 714 of the roller tubes 704 of the assembly 700 to prevent passage of drippings and particles from food products.

Figure 28:
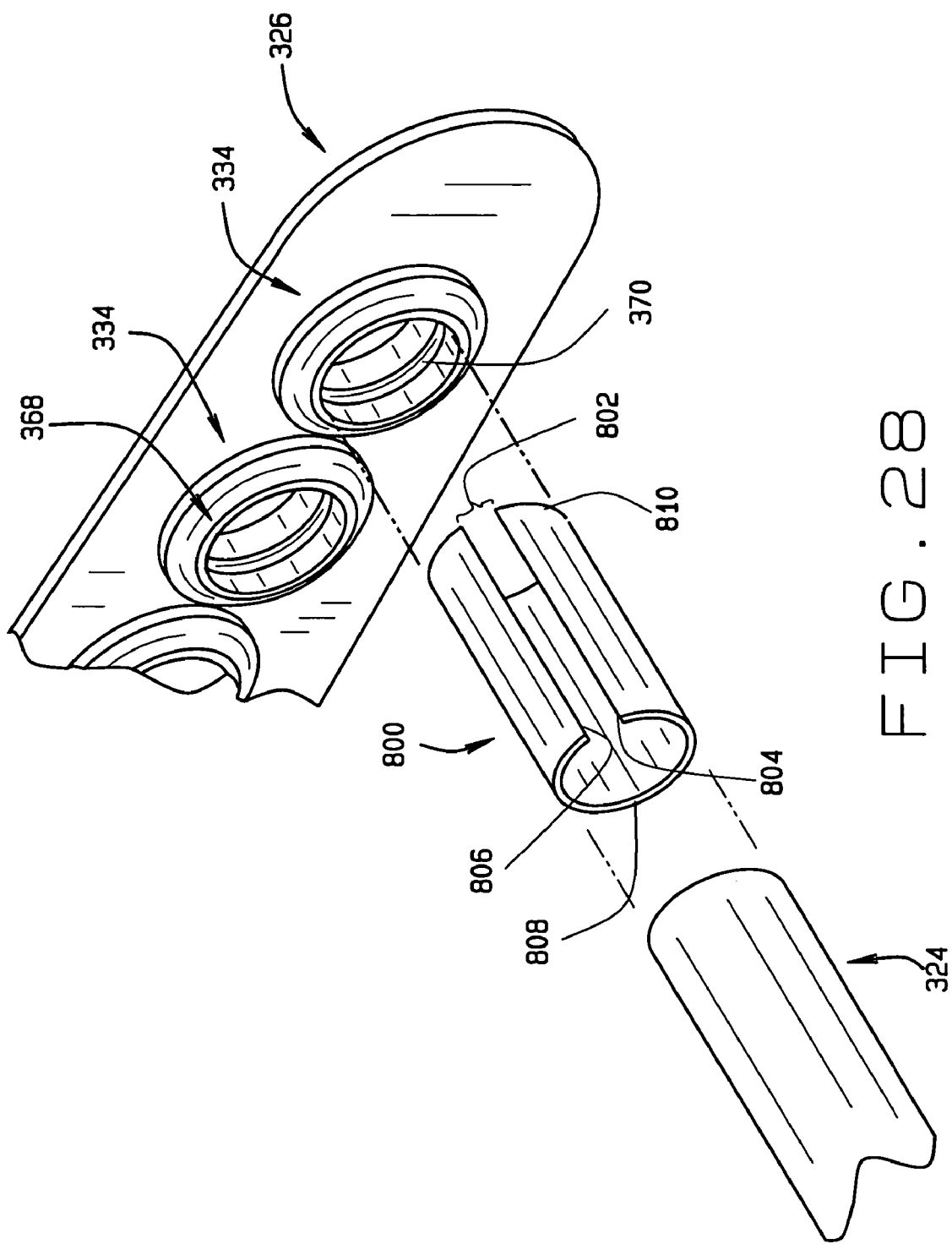
FIG. 28 is an exploded view showing a tool for mounting a roller tube with the divider.

FIG. 28 shows a tool 800 which may be used to mount the roller tube 324 to or through the ensemble 326. The tool 800 is elongated with an arcuate cross section and is illustrated having a generally cylindrical shape, with a slot 802 separating two longitudinal edges 804 and 806. The tool 800 has a first end 808, and a second end 810, both of which are of arcuate shape, and illustrated as generally being of a partially circular shape. The tool 800 can be constructed of spring steel.

For purposes of illustration in FIG. 28, a portion of the divider ensemble 326 is shown. The bearing sealing assembly 334, positioned at the front of the ensemble 326, is shown axially aligned with tool 800 with an O-ring 370 in place. Whereas, for purposes of illustration, the tool 800 is shown to the left of the divider ensemble 326, the tool 800 can be inserted through the bearing fitting 368 and the O-ring 370 from the right side of the divider ensemble 326 as well. The tool 800 can be compressed by the hand so as to pass through the O-ring 370 and the bearing 368, such as about ¼ to ½ inch past the bearing 368. The tool 800 can then be released by the hand so that it expands outwardly to stretch the O-ring 370 to press it firmly into its conforming bore section 396 (not shown in FIG. 28). In such position the tool 800 is in a compressed state and has a generally cylindrical shape and its ends 808 and 810 have a generally circular shape. With the tool 800 so positioned, the roller tube 324 can be inserted from the position in which it is shown in FIG. 28, to pass into the tool end 808. The tube 324 can continue to be inserted through the tool 800 and through bearing fitting 368 to extend about ½ inch beyond the inside of bearing fitting 368. The tube 324 could be inserted a lesser or farther distance if desired. After insertion to such point, the tool 800 can be grasped by the operator and slid away from the tube 324 and the ensemble 326 to thus become disengaged from the tube 324 and from the bearing 368 and the O-ring 370. The tube 324 is thus positioned to continue pressing the O-ring 370 outwardly into its conforming bearing bore 396. The roller tube 324 can thence be moved through the bearing fitting 368 and the O-ring 370 until the divider ensemble 326 is located in the desired position relative to the tube 324 to provide for the desired amount of space for cooking areas 330 and 332. The process or method can then be repeated for inserting the tool 800 through the bearing fittings 368 and the O-rings 370 in the remaining sealing assemblies 334 to give the desired amount of space for the cooking areas 330 and 332.

Figure 29:
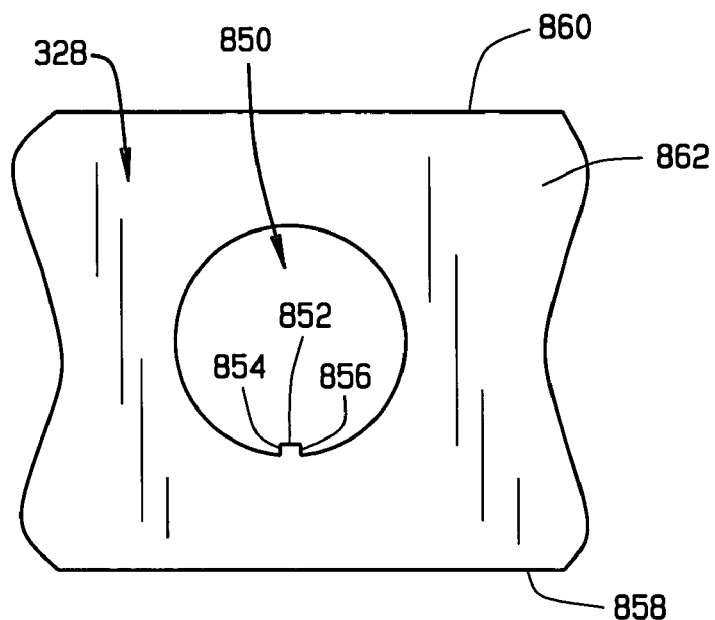
FIG. 29 is a broken side elevation of the divider of FIG. 11.

Referring now to FIG. 29, a partial view of the divider partition wall member 328 is depicted to illustrate the construction thereof. In particular, the wall 328 has a plurality of circular openings 850, of which only one is illustrated, sized to allow a corresponding roller tube 324 to extend there through. Each opening 850 has at its lower edge a tab 852 that projects radially inwardly. The tab 852 is integral with the partition wall member 328. The tab 852 also has a radially extending left wall 854 and a radially extending right end wall 856. The partition wall 328 has a lower edge 858 and an upper edge 460 which are preferably approximately straight and parallel with each other. The edges 458 and 860 extend into the lower and upper edges of the curved ends 364 and 366, shown in FIGS. 11 and 13, respectively. The partition 328 also has a pair of side surfaces 862, of which only one such surface 862 is shown in FIG. 29. The roller tube sealing sub-assemblies 334 fit with the partition 328 and are adapted to mate with the tab 852, as will be described herein.

Figure 30:
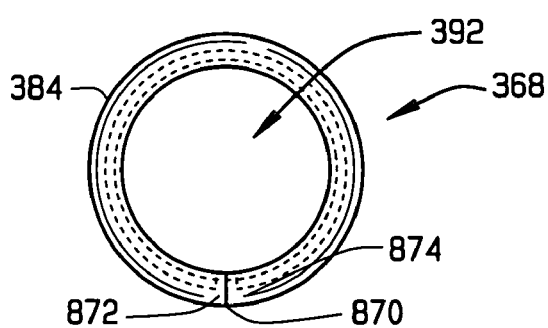
FIG. 30 is a side elevation of an isolated bearing/sealing subassembly of FIGS. 14 and 15.
Figure 31:
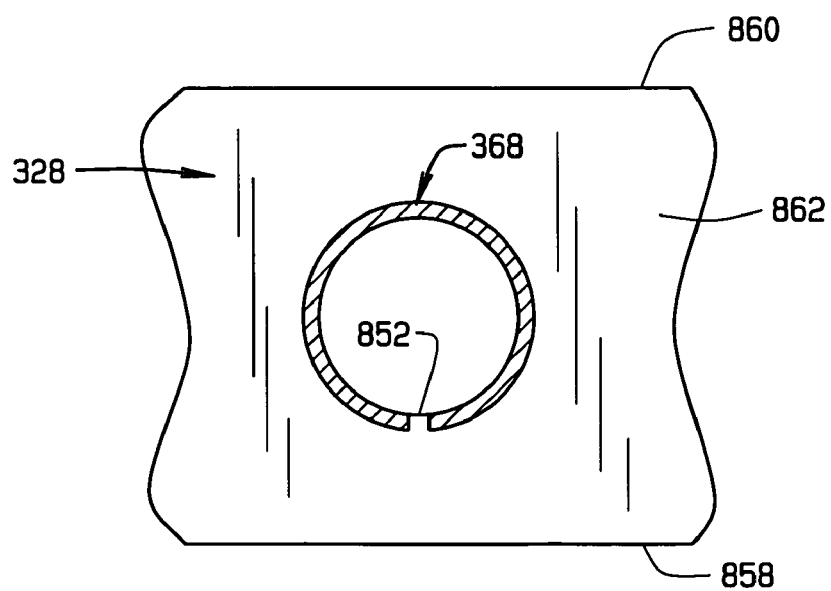
FIG. 31 is a broken side view of the divider of FIG. 11 showing a section of an installed bearing/sealing subassembly.

With reference now to FIG. 30, a side view of a bearing 368 is depicted. The bearing 368 has a radial slit 870 that separates the bearing 368. The slit 870 extends from the bearing outer edges 384 and 386 (not shown) to the bore 392. The slit 870 separates the bearing 368 so that it has first and second ends 872 and 874, which can be pulled apart or away from each other when the bearing 368 is in the isolated position of FIG. 30. The ends 872 and 874 of the slit 870 may be pulled part far enough to fit or mate with the tab 852. FIG. 31 illustrates the bearing 368 fitted within the opening 850 of the wall 328.

To install the bearing seal 368 with the partition 328, the bearing seal 368, in its isolated position of FIG. 30, is grasped and the ends 872 and 874 are pulled apart. The bearing seal 368 is inserted into the circular opening 850 and the ends 872 and 874 contact or abut the tab 852. Once the bearing seal 368 is installed, the O-ring 370 can then be installed within bearing 368. With the bearing seal 368 mounted in the partition wall 328, the annular wall opening 850 of the wall 328 fits approximately flush against the annular surface of the bearing seal 368. The radially extending left wall 854 and the radially extending right end wall 856 engage the bearing 368 to resist rotation of the bearing 368 relative to the partition wall 328 regardless of the direction of rotation of the tube 324. The anti-rotation action of the tab 852 in conjunction with the ends 872 and 874 of the bearing 368 help to resist wear and tear of the bearing 368.

As can be appreciated from the foregoing, although one divider ensemble 326, 602, or 702 has been discussed that divides the assembly 320, 600, or 700 into two cooking areas, it should be recognized and understood that an additional divider ensemble can also be placed about the roller tubes 324 in the same fashion as shown and spaced from the other divider ensemble so as to divide the assembly into three separate cooking areas. Further, additional ensembles could be used to divide the cooking area into a larger number of sections, for example, four or more cooking areas. It is also contemplated and possible that the cooking areas 330 and 332 may be sectioned into equal areas or that one cooking area will be larger than the other cooking area. As can be further appreciated, the divider ensembles 326, 602, and 702 can be easily moved, installed, or repositioned on the tubular cooking members. It is also possible and contemplated that the divider ensembles 326, 602, and 702 may be used on the same roller grill assembly.

Although the series of roller tubes 324 are shown mounted at an angle relative to the housing 322 it should be understood that the roller tubes 324 may also be aligned parallel to each other and on a horizontal plane or with roller tubes 324 that angle downwardly from the front to the rear of the housing 322 and the ensembles 326, 602, or 702 can be used equally well with such orientations of the roller tubes 324. In either case, there preferably are at least about 1-¼ to 1-¾ inches of clearance between the lowest point of the divider wall 328 and the uppermost point of the grease tray 344.

From all that has been said, it will be clear that there has been shown and described herein a roller grill for cooking human food having a section divider ensemble which fulfills the various objects and advantages sought therefore. It will be apparent to those skilled in the art, however, that many changes, modifications, variations, and other uses and applications of the subject roller grill for cooking human food having a section divider ensemble are possible and contemplated. All changes, modifications, variations, and other uses and applications which do not depart from the spirit and scope of the invention are deemed to be covered by the invention, which is limited only by the claims which follow.

What is claimed is:

1. A roller grill for cooking human food, comprising:
a housing having a front, a back, a floor, a pair of sidewalls, and a plurality of tubular cooking members rotatably mounted between the sidewalls; and
a section divider ensemble for sectioning the tubular cooking members into a first cooking area and a second cooking area, wherein the section divider comprises a first mounting brace positioned toward a front of the housing, a second mounting brace positioned toward a back of the housing, and a divider member shaped to be supported by the braces in a position above the tubular cooking members to section the tubular cooking members into a first cooking area and a second cooking area without the divider member contacting the tubular cooking members.

2. The roller grill of claim 1 wherein the divider ensemble comprises a first mounting brace having a plurality of openings and being positioned toward a front of the housing, a second mounting brace having a plurality of openings and being positioned towards a back of the housing, and a divider member shaped to be inserted into an opening of the first brace and into an opening of the second brace so that the first and second brace support the divider member at a position above the tubular cooking members to section the tubular cooking members into a first cooking area and a second cooking area.

3. The roller grill of claim 1 further comprising a second divider member that is shaped to be supported by the braces to section the tubular cooking members into a third cooking area.

4. The roller grill of claim 2 further comprising a second divider member shaped to be inserted into an opening of the first brace and into an opening of the second brace so that the first and second brace support the second divider member at a position above the tubular cooking members to section the tubular cooking members into a third cooking area.

5. The roller grill of claim 2 wherein the section divider ensemble further comprises a pair of front brackets that are attached to the housing, the brackets being shaped to engage and hold the first mounting brace to the housing.

6. The roller grill of claim 5 wherein each of the front brackets comprises a pair of projections shaped to engage and support the first brace.

7. The roller grill of claim 6 wherein the first brace has a pair of flanges with each of the flanges having a pair of notches that are shaped to receive the pair of projections so that the front brackets support the first brace.

8. The roller grill of claim 2 wherein the section divider ensemble further comprises a pair of back brackets that are attached toward the back of the housing, the back brackets being shaped to engage and hold the second mounting brace to the housing.

9. The roller grill of claim 8 wherein each of the back brackets comprises a pair of projections shaped to engage and support the second brace.

10. The roller grill of claim 8 wherein the second mounting brace has a pair of flanges with each of the flanges having a pair of notches that are shaped to receive the pair of projections.

11. The roller grill of claim 1 further comprising a product identifier label constructed to being positioned on the section divider ensemble for identifying what product is being cooked in the first cooking area.

12. The roller grill of claim 1 further comprising, a drip tray positioned above and supported by the floor with the plurality of cooking members positioned between the drip tray and the section divider ensemble.

13. A divider ensemble for a roller grill assembly for cooking a first food product having a first length or being of a first type and a second food product having a second length or being of a second type, the roller grill assembly comprising a housing and a plurality of rotatable tubular cooking members, the divider ensemble comprising:
a first mounting brace having a series of openings positioned toward a front of the housing, a second mounting brace having a series of openings positioned toward a back of the housing, the series of openings in the first mounting brace being aligned with the series of openings in the second mounting brace;

the first mounting brace having a pair of flanges with each of the flanges having a pair of notches;

the second mounting brace having a pair of flanges with each of the flanges having a pair of notches;

a pair of front brackets that are attached to the housing toward the front of the housing, the front brackets each comprising a pair of projections shaped to be received by the notches of each of the flanges of the first mounting brace, to support the first brace;

a pair of back brackets that are attached to the housing toward the back of the housing, the back brackets each comprising a pair of projections shaped to be received by the notches of the flanges of the second mounting brace to support the second brace; and a divider member shaped to be inserted into the openings of the first and second mounting braces so that the divider member is supported above the tubular members to divide the tubular cooking members into a first cooking area for cooking the food product having the first length or being of the first type and a second cooking area for cooking the food product having the second length or being of a second type.

14. The divider ensemble of claim 13 wherein the divider ensemble further comprises a second divider member that is shaped to be inserted into the openings of the first and second mounting brace to be supported above the tubular members to section the tubular cooking members into a third cooking area.

15. The divider ensemble of claim 14 further comprising a product identifier label adapted to being positioned on the first mounting brace for identifying what product is being cooked in the first cooking area.

16. The divider ensemble of claim 15 further comprising a second product identifier label adapted to being positioned on the first mounting brace for identifying what product is being cooked in the second cooking area.

17. In a roller grill assembly for cooking food, the roller grill assembly having a housing with a front, a back, a floor a pair of sidewalls and a plurality of tubular cooking members rotatably mounted to the sidewalls, a divider ensemble comprising:

a first mounting brace for attaching toward the front of the housing, and a second mounting brace for attaching toward the back of the housing; and a divider member, the divider member and the first and second braces being shaped so that the divider member is supported by the braces in a position above the tubular cooking members to section the tubular cooking members into a first cooking area and a second cooking area without the divider member contacting the tubular cooking members.

18. In the roller grill assembly of claim 17, wherein the section divider ensemble further comprises the first mounting brace and the second mounting brace each having a plurality of aligned openings, and the divider member having a first end and a second end, with the openings in the first brace being sized to receive the first end of the divider member, and the openings in the second brace being sized to receive the second end of the divider member.

19. In the roller grill assembly of claim 17, further comprising a pair of front brackets that are attached toward the front of the housing, and a pair of back brackets that are attached toward the back of the housing, the first brace having its ends shaped and the front brackets being shaped so that the ends of the first brace fit with the front brackets to be supported by the front brackets, the second brace having its ends shaped and the front brackets being shaped so that the ends of the second brace fit with the rear brackets to be supported by the rear brackets.

20. In the roller grill assembly of claim 19, wherein the front pair of brackets have a pair of projections shaped to engage and support the first brace, and wherein the back brackets comprise a pair of projections shaped to engage and support the second brace.

21. In the roller grill assembly of claim 20, wherein the first brace has a pair of flanges with each of the flanges having a pair of notches shaped to receive the pair of projections of the front brackets, and the second brace has a pair of flanges with each of the flanges having a pair of notches shaped to receive the pair of projections of the back brackets.

22. The roller grill of claim 17 further comprising, a drip tray positioned above and supported by the floor with the plurality of cooking members positioned between the drip tray and the section divider ensemble.

23. In a roller grill assembly for cooking food, the roller grill assembly having a housing with a front and back, a pair of sidewalls and a plurality of tubular cooking members, a divider ensemble comprising:

a first pair of brackets for mounting to the sidewalls at the front of the housing, the pair of brackets having a pair of projections;

a second pair of brackets for mounting to the sidewalls at the back of the housing, the pair of brackets having a pair of projections;

a first mounting brace having a series of openings, and a pair of flanges each having a pair of notches that mate with the projections of the first pair of brackets to be supported by the first pair of brackets;

a second mounting bracket having a series of openings for alignment with the openings of the first brace, and a pair of flanges each having a pair of notches that mate with the projections of the second pair of brackets to be supported by the second pair of brackets; and a divider member for positioning in the openings in the first and second mounting braces to support the divider member above the tubular members to section the tubular cooking members into a first cooking area and a second cooking area.

24. The divider ensemble of claim 23 further comprising a product identifier label constructed to being positioned on the first mounting brace for identifying what food is being cooked in the first cooking area.

25. The divider ensemble of claim 24 further comprising a second divider member for positioning in the openings in the first and second mounting braces to support the divider member above the tubular members to section the tubular cooking members into a third cooking area.

* * * * *